United States Patent
Xie et al.

(10) Patent No.: US 9,152,540 B2
(45) Date of Patent: *Oct. 6, 2015

(54) SYSTEM AND METHODS FOR GENERATING AND MANAGING A VIRTUAL DEVICE

(71) Applicant: OREGON STATE BOARD OF HIGHER EDUCATION ON BEHALF OF PORTLAND STATE UNIVERSITY, Portland, OR (US)

(72) Inventors: Fei Xie, Portland, OR (US); Kai Cong, Portland, OR (US); Li Lei, Portland, OR (US)

(73) Assignee: Oregon State Board of Higher Education on Behalf of Portland State University, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/353,353

(22) PCT Filed: Jan. 11, 2013

(86) PCT No.: PCT/US2013/021232
§ 371 (c)(1),
(2) Date: Apr. 22, 2014

(87) PCT Pub. No.: WO2014/035463
PCT Pub. Date: Mar. 6, 2014

(65) Prior Publication Data
US 2014/0304685 A1  Oct. 9, 2014

Related U.S. Application Data

(63) Continuation of application No. 13/601,425, filed on Aug. 31, 2012, now Pat. No. 8,666,723.

(51) Int. Cl.
*G06F 9/455* (2006.01)
*G06F 11/36* (2006.01)

(52) U.S. Cl.
CPC ............ *G06F 11/3668* (2013.01); *G06F 9/455* (2013.01); *G06F 11/3672* (2013.01)

(58) Field of Classification Search
CPC .............. G06F 9/45504; G06F 9/3017; G06F 9/45537; G06F 9/45533; G06F 9/30174
USPC .......................................................... 703/26
See application file for complete search history.

(56) References Cited

U.S. PATENT DOCUMENTS 6,353,806 B1  3/2002  Gehlot
7,840,790 B1  11/2010  Sekhar et al.
(Continued)

FOREIGN PATENT DOCUMENTS

WO  2011-072340 A1  6/2011

OTHER PUBLICATIONS

"Security Considerations of Commodity x86 Virtualization (2006)", Sami Vaarala.*

(Continued)

*Primary Examiner* — Saif Alhija
(74) *Attorney, Agent, or Firm* — Schwabe, Williamson & Wyatt

(57) ABSTRACT

Embodiments of the present disclosure may be configured to permit development and validation of a device driver or a device application program by using improved virtual devices. Such improved virtual devices may facilitate driver development without use of physical devices or hardware prototypes. In various embodiments, advanced validation of a device-driver combination may be permitted that would be difficult to achieve even with a physical device. Certain embodiments also may detect inconsistencies between virtual and physical devices, which may be used to improve drivers and device application programs and increase compatibility of such drivers and device application programs with physical devices.

2 Claims, 14 Drawing Sheets

(56) References Cited

U.S. PATENT DOCUMENTS

| | | | |
|---|---|---|---|
| 7,941,813 | B1 | 5/2011 | Protassov et al. |
| 2007/0074226 | A1 | 3/2007 | Zimmer et al. |
| 2009/0113422 | A1 | 4/2009 | Kani |

OTHER PUBLICATIONS

Baluda, M. et al., "Structural coverage of feasible code," 5th International Workshop on Automation of Software Test, May 3, 2010, pp. 59-66.

Barham, P. et al., "Xen and the Art of Virtualization," ACM Symposium on Operating Systems Principles, Oct. 19, 2003. pp. 164-177.

QEMU: Open Source Processor Emulator, Main Page, http://wiki.qemu.org/Main_Page, 2012.

Bellard, F., "QEMU, a Fast and Portable Dynamic Translator," FREENIX Track: USENIX Annual Technical Conference, Apr. 10, 2005, pp. 41-46.

Bethea, D. et al., "Server-Side Verification of Client Behavior in Online Games," ACM Transactions on Information and Systems Security, Dec. 2011, 27 pages, vol. 14, No. 4.

Cadar, C. et al., "RWset: Attacking Path Explosion in Constraint-Based Test Generation," Tools and Algorithms for the Construction and Analysis of Systems, 14th International Conference, Mar. 29, 2008, 49 pages.

Boonstoppel, P. et al., "RWset: Attacking Path Explosion in Constraint-Based Test Generation," Tools and Algorithms for the Construction and Analysis of Systems, 14th International Conference, Mar. 29, 2008, 16 pages.

Boule, M. et al., "Adding Debug Enhancements to Assertion Checkers for Hardware Emulation and Silicon Debug," International Conference on Computer Design, Oct. 1, 2006, pp. 294-299.

Brumley, D., "Towards Automatic Generation of Vulnerability-Based Signatures," Proceedings of the 2006 IEEE Symposium on Security and Privacy, May 1, 2006, 15 pages.

Cadar, C., "EXE: Automatically Generating Inputs of Death," 13th ACM Conference on Computer and Communications Security, Oct. 30, 2006, pp. 322-335.

Cadar, C., "Execution Generated Test Cases: How to Make Systems Code Crash Itself," International Workshop on Model Checking of Software, 2005, 14 pages.

Chipounov, V. et al., "In-Vivo Multi-Path Analysis of Software Systems," Sixteenth International Conference on Architectural Support for Programming Languages and Operating Systems, Mar. 5, 2011, pp. 265-278.

Chou, A. et al., "An Empirical Study of Operating Systems Errors," Operating Systems Review—SIGOPS, 2001, pp. 73-88, vol. 35, No. 5.

Costa, M. et al., "Bouncer: Securing Software by Blocking Bad Input," 21st ACM Symposium on Operating Systems Principles, Oct. 14, 2007, 14 pages.

Costa, M. et al., "Vigilante: End-to-End Containment of Internet Worms," 20th ACM Symposium on Operating Systems Principles, Oct. 23, 2005, 15 pages.

De Paula, F. et al., "BackSpace: Formal Analysis for Post-Silicon Debug," Proceedings of the 2008 International Conference on Formal Methods in Computer-Aided Design, Nov. 17, 2008, pp. 1-10.

Emmi, M. et al., "Dynamic Test Input Generation for Database Applications," International Symposium on Software Testing and Analysis, 2007, pp. 151-162.

Ganesh, V. et al., "A Decision for Bit-Vectors and Arrays," 19th International Conference on Computer Aided Verification, Jul. 3, 2007, pp. 524-536.

Godefroid, P. et al., "Automated Whitebox Fuzz Testing," Network Distributed Security Symposium, Internet Society, 2008, 25 pages.

Godefroid, P. et al., "Automated Whitebox Fuzz Testing," Network and Distributed System Security Symposium, 2008, 13 pages.

Godefroid, P., "Compositional Dynamic Test Generation," ACM SIGPLAN-SIGACT Symposium on Principles of Programming Languages, Jan. 7, 2007, pp. 47-54.

Godefroid, P. et al., "DART: Directed Automated Random Testing," ACM SIGPLAN Conference on Programming Language Design and Implementation, Jun. 12, 2005, pp. 213-223.

Hao, K. et al., "Componentizing Hardware/Software Interface Design," Design Automation Test in Europe Conference Exhibition, Apr. 20, 2009, 6 pages.

Hao, K. et al., "Optimizing Equivalence Checking for Behavioral Synthesis," Proceedings of the Conference on Design, Automation and Test in Europe, Mar. 8, 2010, pp. 1500-1505.

Hu, A. et al., "Efficient Generation of Monitor Circuits for GSTE Assertion Graphs," International Conference on Computer-Aided Design, Nov. 11, 2003, pp. 154-159.

Jungo, USB Market Overview, 2011, 4 pages.

Kadav, A. et al., "Tolerating Hardware Device Failures in Software," 22nd ACM Symposium on Operating Systems Principles, Oct. 11, 2009, pp. 59-71.

King, J., "Symbolic Execution and Program Testing," Communications of the ACM, Jul. 1976, pp. 385-394, vol. 19, No. 7.

Kurshan, R. et al., "Combining Software and Hardware Verification Techniques," Formal Methods in System Design, 2002, pp. 251-280, vol. 21.

Kuznetsov, V. et al., "Testing Closed-Source Binary Device Drivers with DDT," Proceedings of the USENIX Annual Technical Conference, Jun. 2010, pp. 1-14.

Lattner, C. et al., "LLVM: A Compilation Framework for Lifelong Program Analysis & Transformation," Proceedings of the International Symposium on Code Generation and Optimization, 2004, 12 pages.

Li, J. et al., "Component-Based Abstraction and Refinement," International Conference on Software Reuse, May 25, 2008, pp. 39-51.

Li, J. et al., "Embedded Architecture Description Language," Annual IEEE International Computer Software and Applications Conference, 2008, pp. 36-43.

Li, J. et al., "Formalizing Hardware/Software Interface Specifications," 26th IEEE/ACM International Conference on Automated Software Engineering, Nov. 6, 2011, pp. 143-152.

Li, J. et al., "Guiding Component-Based Hardware/Software Co-Verification with Patterns," 33rd EUROMICRO Conference on Software Engineering and Advanced Applications, 2007, 8 pages.

Mentor Graphics, ModelSim Advance Simulation and Debugging, 2012.

Monniaux, D., "Verification of Device Drivers and Intelligent Controllers: a Case Study," ACM Conference on Embedded Systems Software, Oct. 1, 2007, 7 pages.

Murphy, B. et al., "Software Reliability Engineering for Mass Market Products," Journal of Software Technology, Dec. 2004, 5 pages, vol. 8, No. 1.

Nacif, J. et al., "The Chip is Ready. Am I done? On-chip Verification using Assertion Processors," International Conference on Very Large Scale Integration of System-on-Chip, Dec. 1, 2003, 6 pages.

Nelson, S. et al., "Virtualization: Writing (and testing) device drivers without hardware," Linux Plumbers Conference, Sep. 7, 2011, 32 pages.

OPENCORES, Open Source Hardware IP, 2012, 2 pages.

VirtualBox, Welcome to VirtualBox.org, 2012, 1 pages.

PCI, Conventional PCI 3.0 & 2.3: An Evolution of the Conventional PCI Local Bus Specification, 2012, 2 pages.

Portland State University, TableSAT, 2010, 2 pages.

Ray, S. et al., "Connecting Pre-silicon and Post-silicon Verification," Formal Methods in Computer-Aided Design, 2009, pp. 160-163.

Ray, S. et al., "Formal Verification for High-Assurance Behavioral Synthesis," 7th International Symposium on Automated Technology for Verification and Analysis, Oct. 13, 2009, pp. 337-351.

Saturday Academy, Season of Giving, 2012, 2 pages.

Schwoon, S., "Model-Checking Pushdown Systems," Dissertation,Lehrstuhl für Informatik VII der Technischen Universitat Munchen, 2002, 212 pages.

Sen, K. et al., "CUTE: A Concolic Unit Testing Engine for C," Joint Meeting of the European Software Engineering Conference and the ACM SIGSOFT Symposium on the Foundations of Software Engineering, Sep. 5, 2005, pp. 263-272.

(56) References Cited

OTHER PUBLICATIONS

Swift, M. et al., "Improving the Reliability of Commodity Operating Systems," 19th ACM Symposium on Operating Systems Principles, Oct. 19, 2003, pp. 207-222.

Snyder, W., "Introduction to Verilator," 2012, 1 page.

Vess, M., "System Modeling and Controller Design for a Single Degree of Freedom Spacecraft Simulator," Thesis, University of Maryland, 2005, 306 pages.

Visser, W. et al., "Test Input Generation with Java PathFinder," International Symposium on Software Testing and Analysis, Jul. 11, 2004, pp. 97-107.

VMWARE, "The Benefits of Virtualization for Small and Medium Businesses," White Paper, 2009, 11 pages.

VMWARE, "Virtualize Your IT Infrastructure," 2012, 4 pages.

Watson, J., "VirtualBox: Bits and Bytes Masquerading as Machines," Linux Journal, Feb. 1, 2008, 11 pages.

Xen, "What is Xen," Xen.org, 2011, 4 pages.

Xie, F. et al., "Component-Based Hardware/Software Co-Verification," Fourth ACM and IEEE International Conference on Formal Methods and Models for Co-Design, Jul. 27, 2006, pp. 27-36.

Xie, F. et al., "Compositional Reasoning for Hardware/Software Co-Verification," 4th International Symposium of Automated Technology for Verification and Analysis, Oct. 23, 2006, pp. 154-169.

Xie, F. et al., "Unified Property Specification for Hardware/Software Co-Verification," 31st Annual International Computer Software and Applications Conference, 2007, 8 pages.

\* cited by examiner

SYSTEM AND METHODS FOR GENERATING AND MANAGING A VIRTUAL DEVICE

GOVERNMENT FUNDING

The invention was made with government support under grants 0720546 and 0916968 awarded by the National Science Foundation. The United States Government has certain rights in the invention.

CROSS REFERENCE TO RELATED APPLICATION

This application claims the benefit of U.S. patent application Ser. No. 13/601,425 filed Aug. 31, 2012.

FIELD OF THE INVENTION

The present invention generally relates to computer systems. More specifically, the present invention relates to development and testing of computer programs such as virtual devices that simulate or emulate hardware devices, and "device drivers" that facilitate communication between virtual or hardware devices and other hardware or software entities.

BACKGROUND OF THE INVENTION

Computer systems, such as smartphones, personal digital assistants, tablets, netbooks, laptops, and desktops, typically include a processor, communication unit such as a bus, power supply, and, optionally, a housing unit. Often, computer systems are configured to function with peripheral devices, which are termed "devices" for purposes of this application.

Devices may be categorized by the position of each relative to a housing unit. For example, internal devices—called also "integrated devices"—generally are stored inside or integrated with the housing unit. Such integrated devices may include an internal hard drive, CD-R drive, CD-ROM drive, DVD-ROM drive, sound card, network card, video adapter, or an internal modem. External devices, on the other hand, generally are stored outside of the housing unit and may include a printer, scanner, monitor, touchscreen, keyboard, or pointing devices such as a mouse, gaming controller, or joystick.

Devices may be categorized also by function. For example, storage devices may include an external hard drive, flash drive, disk drive, or any other device configured to permit information storage. Input devices may include keyboard, pointing devices such as a mouse, gaming controller, or joystick, digital camera, webcam, barcode reader, microphone, fingerprint scanner, or any other device configured to permit input of information into the computer. Output devices may include display devices such as a monitor, segment display such as a digital clock display, television set, or tactile electronic display, audio output devices such as speakers or headphones, printers, or any other device configured to permit information output from the computer.

Many devices are configured to provide an output that is perceivable by a user. For purposes of this application, a "perceivable output" may include any perceptible output from the device including, for example, that which is viewable on a display, a touchable button, a light, or stored information. Other perceivable outputs may be input from one device—e.g., a keyboard or a mouse—and perceived as an output on a display device—such as a monitor or a touchscreen.

Computer systems may use hardware, software, or both to manage the resources of the computer system. Software used to manage a computer system's resources is termed an "operating system." When a user seeks to use a device with a computer system, the operating system may not have the information necessary to communicate with that device. Because of the plethora of devices available to connect with computer systems, it would be impractical to include the information necessary for communicating with every device in every operating system. Accordingly, a software program—called a "device driver" or "driver"—allows the device and operating system to communicate with each other. Generally, at least one driver is available for every type of device. At times, a driver may be developed for each of multiple operating systems (e.g., Microsoft Windows, Mac OS X, Android, Linux, BSD, etc.). When the driver permits communication between the operating system and a physical device, the device can perform its function to generate a perceivable input/output.

Drivers also may be used to facilitate communication between the operating system and an application program. An application program—also referred to herein as an "app"—may be configured to permit the user to perform a specific task. Popular apps may include word processing programs, image editing programs, game programs, database management programs, and document management programs. Certain apps may be configured for use specifically with a device. Such an app is termed a "device application program" for purposes of this application.

Conventionally, a driver or an app utilizing a device through the driver could not be developed until the physical device, or at least a stable prototype of the physical device, was completed. Clearly, such a delay in the development and validation of the driver further delays offering of the product for sale. At times, developers begin designing drivers based on predictions of the physical device. When the physical device becomes available, draft versions of the driver often require substantial revisions, which results in a largely inefficient process.

To shorten the development cycle, systems have been built to enable earlier development of a driver. One such approach includes using an early prototype such as a Field-Programmable Gate Array ("FPGA prototype") for driver development. However, such prototypes can delay the start of driver development until the register transfer level ("RTL") design of the device is generally finished. Also, an FPGA prototype may differ significantly from the physical device. As a result, the driver developed to work with that prototype may need significant revision in order that it can function with the physical device.

In addition, known approaches for testing an FPGA prototype, or even the physical device, during driver development permit only limited observation of the internal conditions of the prototype or device. Also, prototypes and physical devices generally do not permit recording events that occurred, for example, before an error, and are difficult to control without a time-consuming and labor-intensive bootstrapping process.

Another approach to enable the development of a driver involves the utilization of virtual machines and virtual devices. A "virtual machine" is a software program configured to simulate the operation of certain hardware or operating system with minimal access to the actual hardware or operating system in the host computer system. In certain embodiments, a virtual machine is a simulated computer system operating within, but generally isolated from, a physical computer system.

A "virtual device" is a software program configured to simulate the operation of or function as a physical device without access to the physical device or a prototype of the physical device. In various embodiments, a virtual device may be configured to have the same functional restrictions and other restrictions as physical devices. In various embodiments, a virtual device may be presented as a virtualized replacement of a physical device.

Virtual devices may operate within an environmental infrastructure such as a virtual machine or an operating system. When functioning in a virtual machine, a guest operating system may interact with a virtual device as if it is a physical device. This requires no change to the driver stack of the guest operating system. In contrast, when functioning in a non-virtual operating system, an operating system may be extended to allow loading of a virtual device as if it is a physical device. This involves changing the driver stack of the operating system. An example of this approach is the Device Simulation Framework ("DSF"), which allows introduction of virtual devices that model and simulate Universal Serial Bus ("USB") devices in an operating system.

While certain virtual devices are known, such virtual devices have not been optimized for device simulation and driver development. Specifically, certain known virtual devices are too simple to permit development of a driver that consistently functions with the physical device. Other known virtual devices are too complex to create an efficient simulation. For example, certain virtual devices permit observation, tracking, and control of the device, but often result in excess performance overhead and cause the simulation to operate slowly.

In addition, known virtual devices use concrete execution of software code. In other words, to achieve a certain task, a program may execute instructions that include one or more if-then statements (e.g., if A, then B; if not A, then C). In concrete execution, the developer must predetermine which choice the program will make at each decision point. Accordingly, to simulate each physical device behavior, a developer must explicitly specify concrete values and choices or supply run-time scripts for each device behavior. Such virtual devices render it difficult to conduct comprehensive exploration of possible device behaviors and simulation of the possible concurrency in device-driver interaction.

Other known device simulations are not configured to operate in virtualization environments such as DSF and a Quick EMUlator ("QEMU") virtual machine. Such simulations include those generated from device designs at different stages within the development process, for example, transaction-level ("TL") designs in SystemC or SystemVerilog, register-transfer-level ("RTL") designs in Verilog or VHDL, and gate-level ("GL") designs as net-lists.

In addition, methods for preparing testing protocols for known virtual devices and the co-developed drivers typically must be generated manually and/or on a case-by-case basis, which is time-intensive and cost-prohibitive.

Clearly, there is a demand for a system and methods for constructing virtual devices that incorporate various levels of detail from a device design, developing a driver or application program with improved performance, preparing automated testing protocols for validating a driver, driver-device combination, or application program, and verifying conformance between virtual devices and their real counterparts, where such system and methods are configured to maximize the smooth integration of the resulting driver or application program with a physical device.

BRIEF DESCRIPTION OF THE DRAWINGS

The preferred embodiments of the invention will be described in conjunction with the appended drawings provided to illustrate and not to limit the invention, where like designations denote like elements, and in which.

DETAILED DESCRIPTION

Embodiments of the present invention may be configured to use characteristics of virtual devices to improve symbolic execution effectiveness, generate test cases characterizing paths through virtual devices and drivers, provide facilities to replay those paths with the generated test cases, and to assess conformance of virtual devices used for testing during development of physical devices with the physical devices themselves.

Figure 1B:
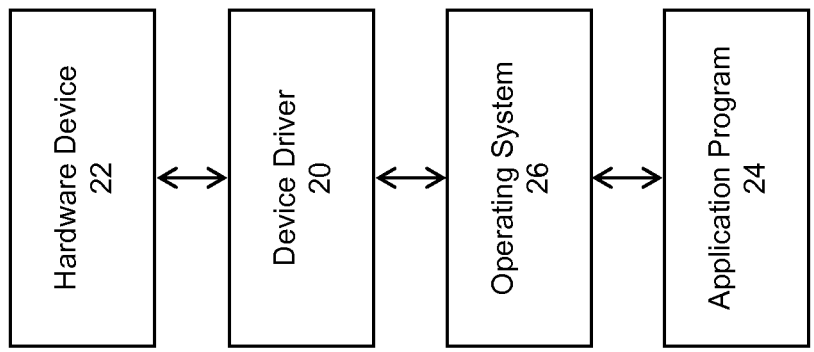
FIG. 1B is a block diagram of an embodiment of a system including device driver configured to facilitate communication between a hardware device, an application program, and operating system, in accordance with various embodiments.
Figure 1A:
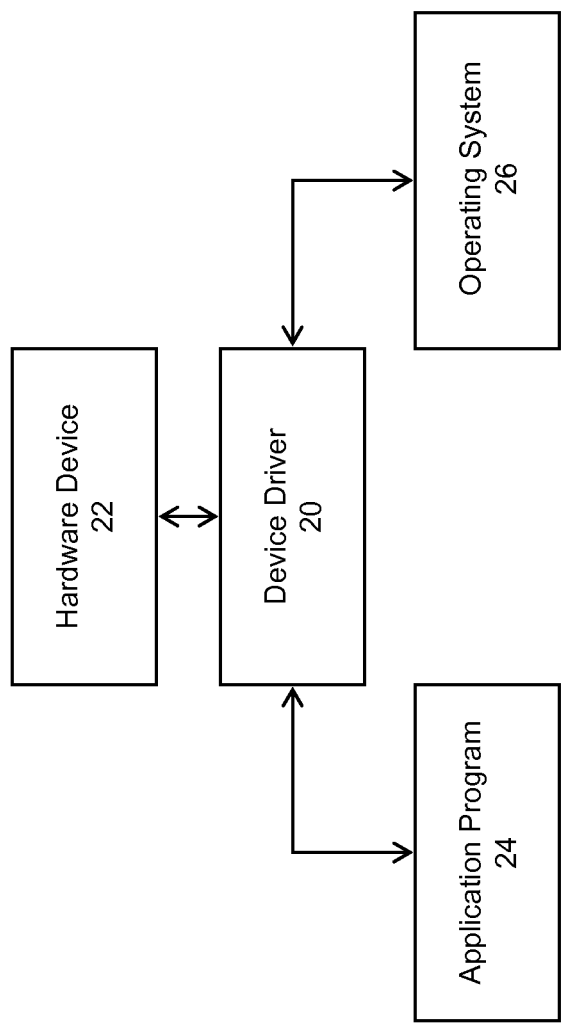
FIG. 1A is a block diagram of an example embodiment of a system including device driver configured to facilitate communication between a hardware device, an application program, and operating system, in accordance with various embodiments.

Referring to FIG. 1A, a device driver 20 may facilitate communication between a hardware device 22 and various other software or hardware logic, such as an application program 24 or an operating system 26. Additionally or alternatively, and as illustrated in FIG. 1B, device driver 20 may facilitate indirect communication between hardware device 22 and application program 24, e.g., through operating system 26. In other embodiments, hardware device 22 may communicate directly with application program 24 or operating system 26.

In various embodiments, device driver 20 may be configured to act as translator between hardware device 22 and other entities, such as application program 24 or operating system 26. For example, device driver 20 may communicate with hardware device 22 through a computer bus or communications link, and with application program 24 or operating system 26 through system calls. When application program 24 or operating system 26 invokes a routine in device driver 20, device driver 20 may issue commands to hardware device 22. Once hardware device 22 sends data back to device driver 20, device driver 20 may invoke routines in application program 24 or operating system 26. Device driver 20 is illustrated with broken lines in various Figures since various drafts of the driver may be developed throughout the implementation of the system and methods.

Certain components of the system 10 of the present invention may form modules, as illustrated in FIGS. 3A, 3B, 4, 5, and 6. An infrastructure module 30 may be configured to provide computer infrastructure to the other modules. A virtual device module 40 may be configured to simulate a hardware device. A support module 50 may be configured to provide support functions such as generating test cases and reports and providing management options to the other modules.

In various embodiments, infrastructure module 30 may include a program environment such as operating system 26 and/or virtual machine 28. Virtual machine 28 may come in various forms, including but not limited to Quick EMUlator ("QEMU"), VMWare, VirtualBox, or Xen. In various embodiments, infrastructure module 30 may also include application program 24. Operating system 26 may include or may be configured to communicate with device driver 20 developed through certain methods of the present invention or other methods. Virtual machine 28 may include a virtual device stub component 32, which may be configured to appear to virtual machine 28 as if it is virtual device 42. Virtual device stub component 32 also may be configured to facilitate communication with the actual virtual device 42 such as by sending and receiving information such as input/output requests to and from a virtual machine interface 46 in virtual device module 40.

In various embodiments, virtual device module 40 may include a virtual device 42, virtual machine interface 46, and a symbolic execution engine 44. Virtual machine interface 46 may be a program configured to facilitate communication with other components such as by sending and receiving information to and from virtual device stub component 32 in infrastructure module 30.

Symbolic execution engine 44 may be configured to facilitate symbolic execution of a computer code, such as virtual device computer code or device driver computer code. Tools that may be used to implement all or aspects of symbolic execution engine 44 may include but are not limited to SAGE, KLEE and S2E, Cute, jCute, CREST, BitBlaze, DART, and Java Pathfinder. In various embodiments, symbolic execution engine 44 may be configured to explore execution paths through a computer program, and to generate a set of constraints called a "path condition" that describes the set of values possible on each explored path. During symbolic execution, variables may be represented as symbolic expressions instead of concrete values. Accordingly, the outputs computed by the computer program may be expressed as a function of input symbolic values. In various embodiments, a symbolic state of a program may include symbolic values of program variables, a path condition, and a program counter. In various embodiments, the path condition may be a Boolean formula comprising constraints accumulated as the path is explored. In order to follow a particular path through a computer program, inputs to the computer program must satisfy the corresponding path condition determined during symbolic execution of the computer program. In various embodiments, the program counter may point to the next statement to be executed.

Embodiments of the support module 50 may include components such as a management component 52, test case generator 53, bug report generator 54, and a coverage report generator 56. Management component 52 may be configured to test, control, and communicate with application program 24, virtual device 42, and device driver 20. Test case generator 53 may generate test cases for use with virtual device 42, device driver 20, and application program 24 to achieve various test criteria. If, during testing, a bug or error is detected, bug report generator 54 may prepare a report describing the bug or error. Coverage report generator 56 may be configured to prepare a report describing the functions and status of virtual device 42, device driver 20, or application program 24. Based on the coverage report, test case generator 53 may generate additional test cases that may improve the coverage.

In various embodiments, virtual device 42 may include a symbolic virtual device ("SVD") or a hardware device design-based virtual device. Embodiments of a symbolic virtual device may be configured to permit non-deterministic device behaviors. For example, instructions for implementing the device may include code with decision points for two or more choices. When the execution reaches that decision point, the decision may be made according to certain guidelines. Advantageously, such instructions may be easier and faster to develop since the developer can provide general guidelines instead of mapping every choice at every decision point.

Program instructions for an SVD may be non-deterministic in terms of both concurrency and environment inputs. Concurrency is a property of a system in which several programs are executing simultaneously and potentially interacting with each other by, for example, sharing certain resources. Environmental inputs may include information received from other system components (e.g., an operating system, application program, or device), and in various embodiments may be symbolic values and/or concrete values.

In various embodiments, symbolic execution engine 44 may be configured to execute an SVD. As noted above, instead of running program code on manually-generated or randomly-generated inputs, engines run the SVD code using a symbolic input initially allowed to be "anything." In various embodiments, symbolic execution engine 44 may replace program inputs with symbolic values and concrete operations with symbolic operations. When execution of the program reaches a decision point based on a symbolic value, symbolic execution engine 44 may follow both options conceptually.

In various embodiments, symbolic execution engine 44 and/or test case generator 53 may be configured to generate test inputs. In various embodiments, test case generator 53 may be part of symbolic execution engine 44, or vice versa. During execution of an SVD, when a path reaches a result, a test case may be generated by solving the current path condition for concrete values. When the concrete values are used as the input, the same path may be followed, which may facilitate identification and/or repair of bugs.

Figure 2A:
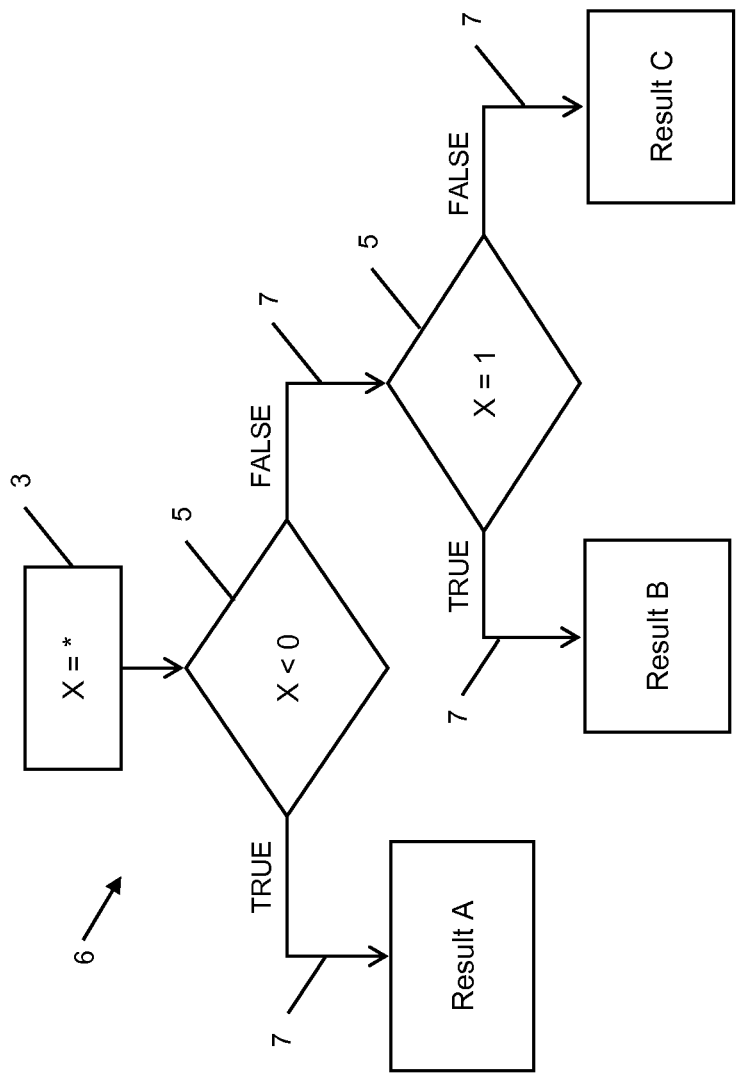
FIG. 2A illustrates an exemplary symbolic execution tree, in accordance with various embodiments.
Figure 2B:
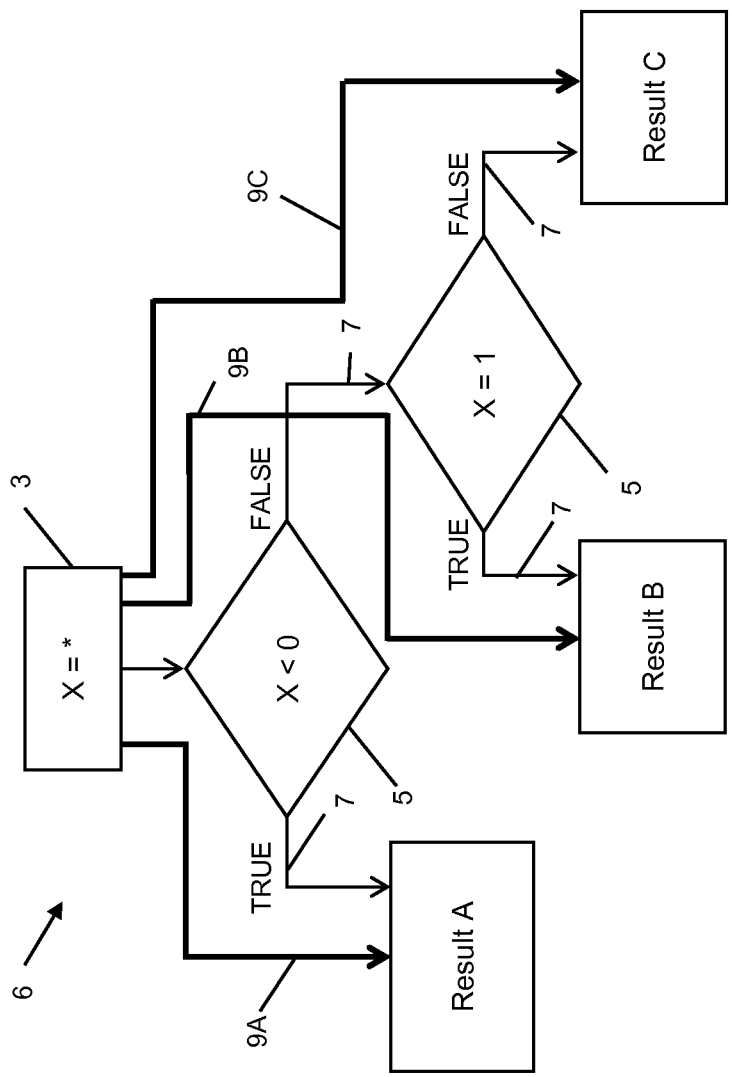
FIG. 2B illustrates a symbolic execution tree and various paths, in accordance with various embodiments.
Figure 3A:
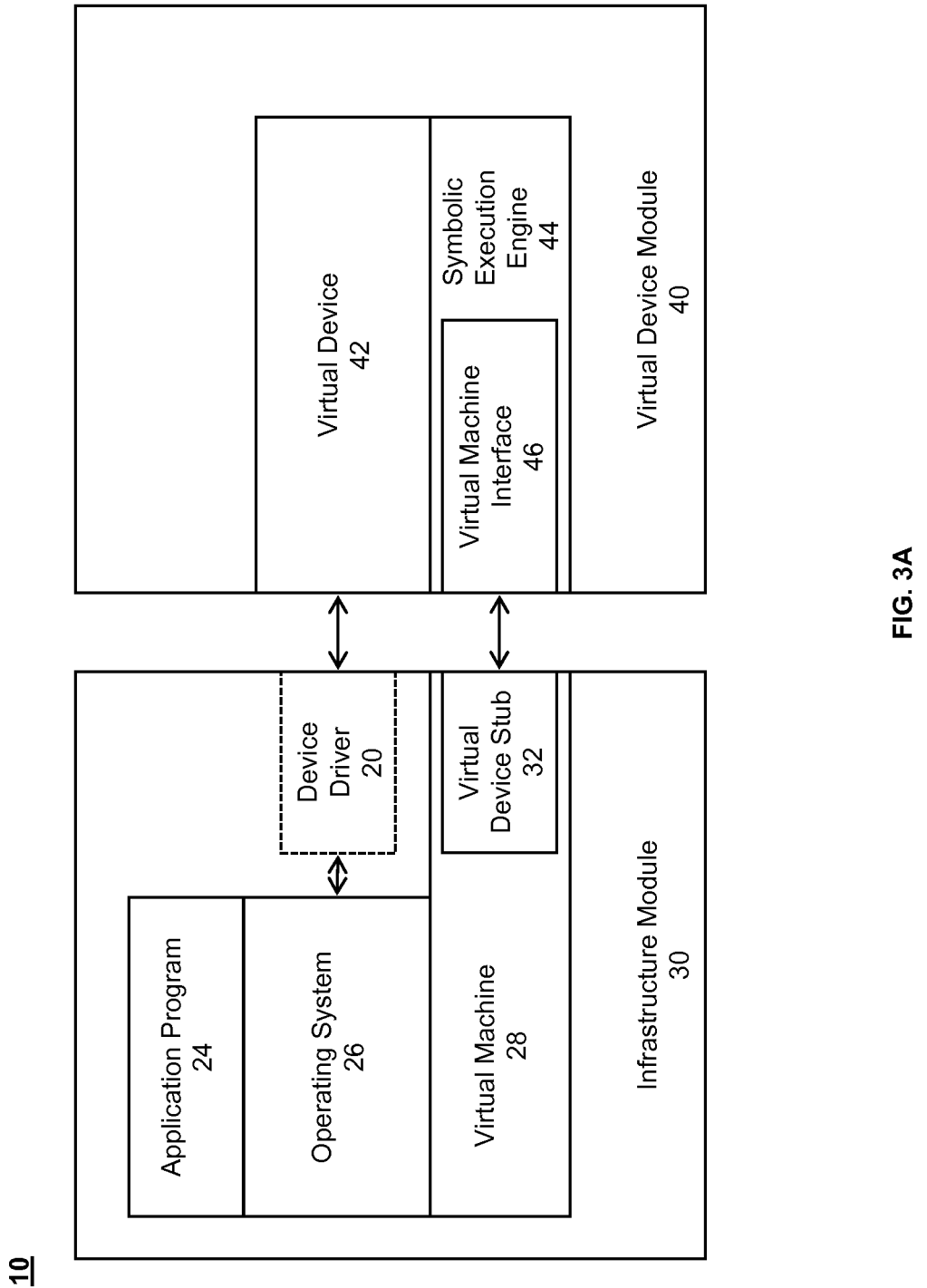
FIG. 3A illustrates an embodiment of a system according to the present invention including an infrastructure module and a virtual device module, in accordance with various embodiments.
Figure 3B:
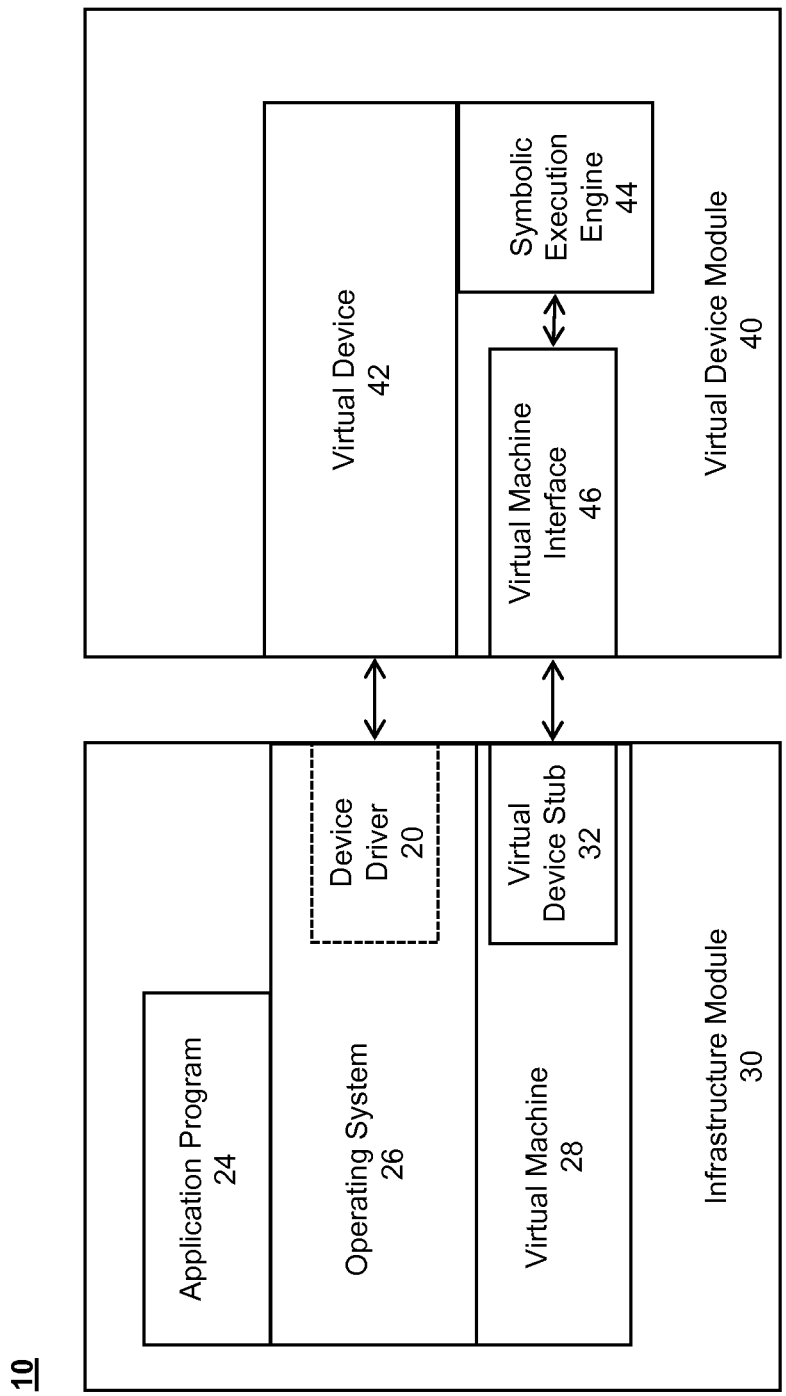
FIG. 3B illustrates an embodiment of a system according to the present invention including an infrastructure module and a virtual device module, in accordance with various embodiments.
Figure 4:
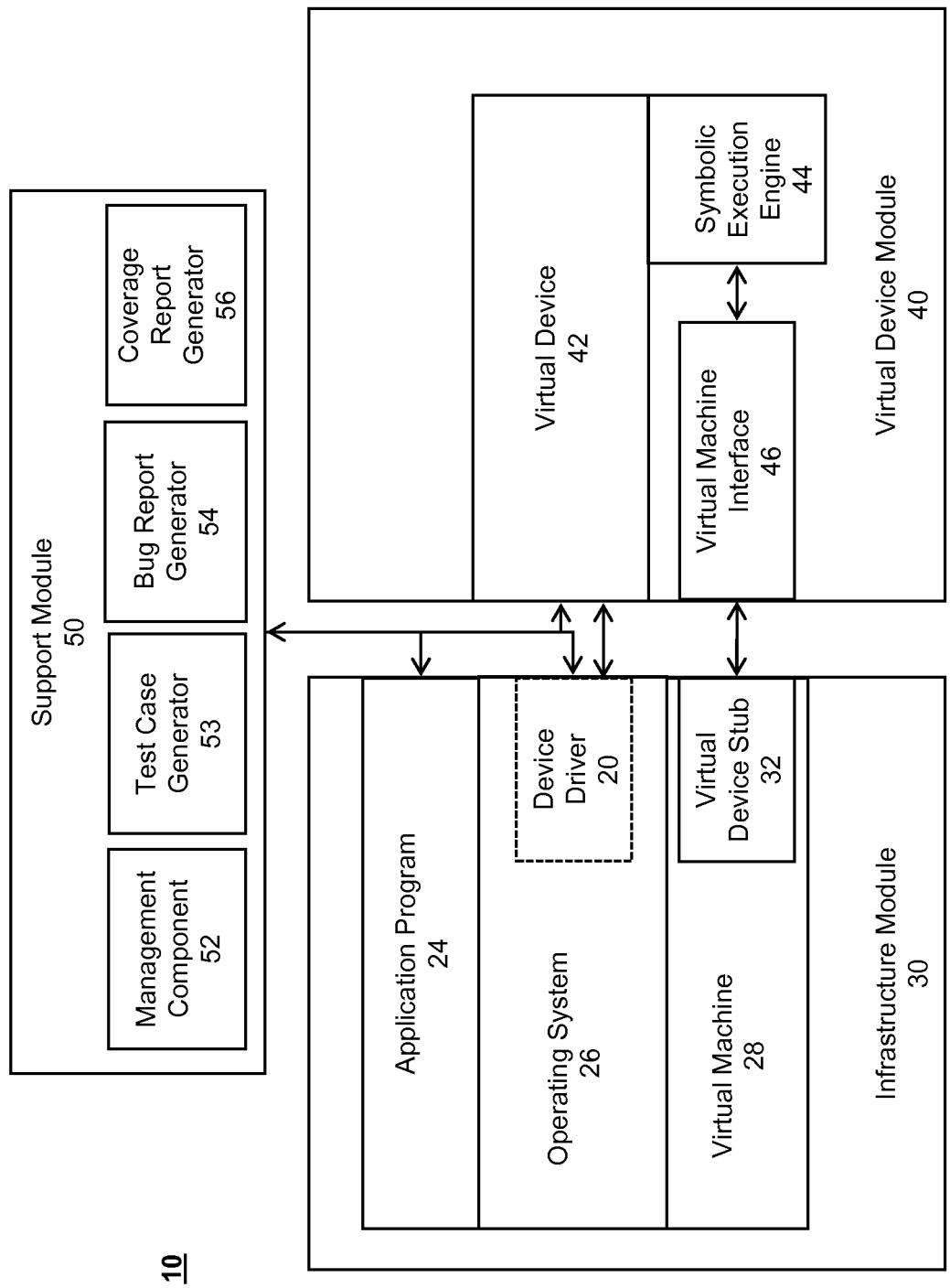
FIG. 4 illustrates an embodiment of a system according to the present invention, including an infrastructure module, a virtual device module, and a support module, in accordance with various embodiments.

A simple example of analysis of every possible path through one or more decision points in a computer program is illustrated in FIG. 2A and FIG. 2B. A symbolic execution tree 6 illustrates the possible paths explored by the symbolic execution of the following computer code:

```
int f(int x)
{
    if(x<0)
        return -x;
    if (x == 1)
        return 2;
    return x;
}
```

In FIG. 2A, decision point nodes 5 may represent the symbolic program states and arcs 7 may represent the state transitions. At the input 3, the variable X has a symbolic value, e.g., any value allowed by its type (in this case, an integer). At each decision point node 5, the constraint is accumulated, and the set of accumulated constraints up to that point may be a current path condition.

FIG. 2B, illustrates the three possible paths, 9A, 9B, and 9C, that may be followed through symbolic execution tree 6. Path conditions may be expressed as Boolean formulas comprising the set of constraints accumulated during traversal of a particular path. For example, the three paths of FIG. 2B may be defined by the following three path conditions:

$X<0$           Path 9A:

$X==1$           Path 9B:

$X \geq 0$ and $x \neq 1$.           Path 9C:

Each path ends at a different result (e.g., result A, result B, result C). A result may be an instruction to return to a specific point in the code (e.g., "return -x", "return 2", "return x"), perform a new action, or end a process. In certain embodiments, the path may reach an error or a "bug" before reaching a result.

The example code above is a simple example. "Real life" code implementing a virtual device or device driver may be dramatically more complex. The number of paths through a program may be roughly exponential in program size. Thus, attempting to traverse all paths of a complex computer program may result in so-called "path explosion." Path explosion may strain computing resources (e.g., processing cycles, memory) and development schedules, limiting the ability to utilize symbolic execution to thoroughly test computer programs such as device drivers or virtual devices.

Accordingly, embodiments of an engine may be configured to minimize or eliminate the challenges with exponential path possibilities, e.g., by managing use of computing resources such as processing cycles and memory. One or more restraints may be applied when executing the virtual device. One type of restraint is a loop bound, which may be added to bound loops with loop conditions that are symbolic expressions. In this manner, it may be possible to control or limit the depth to which each loop is explored. In various embodiments, loop bounds may be added manually (e.g., for embodiments having only a few loops) or automatically (e.g., for embodiments having many loops).

Another type of restraint that may be utilized to minimize or eliminate path explosion may be a time bound. A time bound may be configured to require termination of symbolic execution of a computer program (e.g., virtual device, device driver) in a particular amount of time. If the symbolic execution does not completely finish within the given time bound, there may be unfinished paths. For such paths, test cases for the incomplete path conditions may still be generated. In various embodiments, both loop and time bounds may be utilized concurrently.

Embodiments of an engine may be configured to generate reports describing information about traces through a computer program. However, certain reporting methods may result in reports of traces covering the same instruction or sequence of instructions. For example, assume the following simple computer program:

```
int f (int x)
{
    if ( x == 1 || x == 2)
        return 0;
    return 1;
}
```

Symbolic execution similar to that described above with regard to FIGS. 2A and 2B of this computer program may yield two paths and two corresponding path conditions.

$x==1 || x==2$           Path 1:

$x \neq 1$ && $x \neq 2$           Path 2:

However, a computer program executed using symbolic execution engine 44 may be compiled to an intermediate representation in which the compiler may decompose the "if" conditional expression into two separate branches. For example, KLEE may operate on Low Level Virtual Machine ("LLVM") bitcode to find three paths and corresponding path conditions:

$x==1$           Path 1:

$x==2$           Path 2:

$x \neq 1$ && $x \neq 2$.           Path 3:

Paths 1 and 2 may cover the same sequence of computer program instructions. To provide the ability to output a trace report without duplicative traces, in various embodiments, symbolic execution engine 44 or other another component may be configured to detect and eliminate duplicative traces.

In various embodiments, multiple types of reports may be created, e.g., at various levels of complexity. For example, in various embodiments, a virtual device may be executed, e.g., by symbolic execution engine 44, with symbolic value. Test cases may be generated, e.g., by symbolic execution engine 44, that include concrete values for all explored paths. For each generated test case, the virtual device may be executed with the concrete value or values. A path trace may be obtained. If a path trace covers a sequence of code already covered, path information may be output to an extended analysis report. If a path trace covers a sequence of code yet to be covered, then path information may be output in both the extended analysis report and a simplified analysis report that does not include duplicative traces.

In various embodiments, generation of effective test cases may be facilitated by enabling specification of various types of initial states of a virtual device. One example type of initial state is a concrete state. A concrete state may be a predefined state, in which all state variables are assigned specific values. In various embodiments, these values may be captured from a physical device that is the same as or similar to the virtual device. Another type of initial state is a symbolic state, in which all state variables are made symbolic. As described above, the symbolic state may be used to identify paths of a computer program such as a virtual device or device driver. Another type of initial state is a "concolic" state, in which some state variables may be assigned concrete values and other state variables are made symbolic.

Certain embodiments of a virtual device may invoke outside functions from its environment. Such outside functions may be implemented using a function call for a subroutine. In various embodiments, if a function call does not affect a state variable of a virtual device, symbolic execution engine 44 may be configured to display a warning message and refrain from taking further action regarding the function call. If the function call may affect the value of state variable of the virtual devices, on the other hand, the function may be implemented in a stub, which is invoked by the virtual device in symbolic execution.

In various embodiments, once concrete test cases are generated, the virtual device or driver may be executed, e.g., by symbolic execution engine 44, independently or by another component, using the concrete test cases. In some embodiments, the computer program may be executed with generated concrete test cases in a debugging environment that facilitates real-time examination of variables and states, e.g., using breakpoints. In various embodiments, such execution may operate in accordance with the following pseudocode:

```
initialize a stack;
load a test case;
assign the test case to the corresponding variables of device model.
while (true) {
    if there is no user input
        sleep for a period;
        continue;
    switch (user input)
        case forward:
            execute one instruction and display the variable changes;
            push the current state into the stack;
            break;
        case backward:
            pop one state off the stack and set the state as current
                state;
            break;
        case inspect variable:
            search the variable in the current state and return the value
                of the variable;
            break;
        case exit:
            finish execution;
            return;
        default:
            break;
}
```

In various embodiments, a developer may interrupt or change the path while running the concrete test cases, e.g., to permit further exploration of what inputs and initial states are used to trigger the path and inspect values of variables at any step. This method can be easily applied to many types of device models of virtual devices, minimizes overhead, and provides a user-friendly interface.

In various embodiments, symbolic execution engine 44 may be capable of executing one programming language or multiple programming languages. In various embodiments, an SVD specification may be compatible with a specific symbolic execution engine 44 or multiple symbolic execution engines. In various embodiments, an SVD specification may include one programming language, certain language features, or multiple programming languages. Symbolic execution engine 44 may symbolically execute the SVD wherein the environmental inputs are provided as symbolic values rather than concrete values. Additionally, the engine symbolically executes the SVD at decision points wherein the decision is selected non-deterministically from all the possible choices.

Embodiments of an engine may include various constraint solvers such as the STP constraint solver.

Embodiments of an SVD may operate in a number of modes. In a debugging mode, an SVD may be executed symbolically, e.g., by symbolic execution engine 44. As the SVD responds to an input/output request, symbolic execution engine 44 may compute the feasible SVD execution paths at the current device state. The feasible paths may be provided directly to the user to make a choice or the choice is made by a pre-set strategies. This mode may provide for step-by-step debugging by facilitating complete control over the SVD. The debugging mode also may be configured to permit in-situ path prediction and randomized execution of the SVD.

In a profiling mode, an SVD may be executed concretely by the virtual machine and symbolically by the symbolic execution engine, sometimes, simultaneously. Symbolic execution may exhaustively explore all possible execution paths through the SVD. The concrete execution paths of the SVD resulting from a test case may be compared, e.g., by coverage report generator 56, against the symbolic paths to calculate the coverage report for the test case. In this mode, the symbolic paths can be pre-generated by the symbolic engine to improve the run-time profiling efficiency.

Upon executing test cases, the symbolic execution engine 44 may provide the coverage statistics such as statement coverage, branch coverage, path coverage, and transaction coverage information. Transaction coverage information may include identification of some or all possible transactions of an SVD resulting from an environmental input or a driver command. Transaction coverage information also may include an assessment of the impact of a test case or test suite in terms of which transactions or paths have been hit and how often each was hit. Additional metrics specific to devices may also be utilized that considers one or more driver commands and environmental inputs. After the execution statistics such as percentiles for the coverage metrics are collected, they may be visualized graphically as bar charts, pie charts, or other diagrams.

If symbolic execution engine 44 is not compatible with an SVD, or symbolic execution engine 44 is configured for use with a number of SVDs, an adapter may be created for each SVD or a group of SVDs. Such an adapter is termed a "harness" for purposes of this application. In certain embodiments, a harness and an SVD pair may form a stand-alone program. Embodiments of a harness may include a virtual machine with a guest operating system. However, other simpler embodiments are contemplated as well. In various embodiments, a harness may be configured to handle non-deterministic entry function calls, symbolic inputs to device models, and function calls to the environment.

A harness may be generated using manual harness generation or automatic harness generation. Manual generation of a harness may involve examination of how a virtual machine invokes the virtual device, which virtual machine APIs are invoked by a virtual device, and what these APIs invoke recursively. The implementation of the invoked functions is included in the harness. At times, it may be necessary to make a function produce non-deterministic outputs by throwing away its implementation.

Manual harness generation may be useful to generate a harness configured to function with a category of devices. Certain devices are categorized based on functionality, such as network adapters and massive storage devices, or based on a type of interface standard, such as Peripheral Component Interconnect ("PCI") and Universal Serial Bus ("USB").

A harness may be generated automatically by implementing an algorithm that includes a number of steps. First, a call graph—that is a graph displaying the invocation relationships between various subroutines—originating from a virtual device is analyzed to determine which functions were invoked by the virtual device and how often those functions were invoked. Then, based on the frequency of use, certain functions are selected for incorporation into the harness code. It is often sufficient to include the implementations of the first level functions invoked. This algorithm also includes a refinement loop which adjusts based on the symbolic execution, for instance, if making a function non-deterministic leads to a large number of paths, the implementation of this function may need to be included.

Embodiments of a harness, which may be generated manually or automatically, may include a number of components, including declarations of state variables and parameters of entry functions, code for making state variables and inputs of entry functions symbolic, non-deterministic calls to virtual device entry functions, and stub functions for virtual machine API functions invoked by virtual devices.

Regarding the declarations of state variables and parameters of entry functions, in various embodiments, a virtual device may not be a stand-alone program. Accordingly, the state variables and function parameters may be defined. If a virtual device is running in a virtual machine, it may register its entry functions with the virtual machine. Moreover, the virtual machine may help the virtual device manage its state variables. When an entry function is invoked, the state variables and necessary parameters of the function may be transferred to the function from the virtual machine. Other declarations define necessary parameters for the entry functions.

Regarding code for making state variables and inputs of entry functions symbolic, this permits covering as many paths as possible. The inputs of an entry function should contain state variables and necessary parameters. Certain embodiments implement a specific function "svd_make_symbolic" in the engine to initialize the inputs symbolically. All state variables and parameters of entry functions may be made symbolic before they are used.

Regarding non-deterministic calls to virtual device entry functions, virtual devices provide all kinds of entry functions for communicating with the operating system or virtual machine. To analyze a virtual device, all entry functions are executed with symbolic inputs. A symbolic variable is defined in the harness to make nondeterministic calls to all entry functions. Certain functions may be invoked by a driver to write to or read from the device registers. Additional functions may be invoked by the operating system or virtual machine to notify the device about events from outside environments, such as whether there is a physical link to the device and whether there is a new packet to receive.

Regarding stub functions for virtual machine API functions invoked by virtual devices, certain stub functions for selected functionalities are known in the art. Such stub functions may be included in a harness according to desired or necessary functionalities.

The above-described techniques were applied to five existing virtual devices that are distributed with the QEMU virtual machine, and which are described in the Table I, below:

TABLE I

| Virtual Device | Vendor | Description |
| --- | --- | --- |
| E1000 | Intel | Pro/1000 Gigabit Ethernet Adaptor |
| EEPro100 | Intel | Pro/100 Ethernet Adaptor |
| PCNet | AMD | PCNet32 10/100 Ethernet Adaptor |
| RTL8139 | RealTek | PCI Fast Ethernet Adaptor |
| Tigeon 3 | Broadcom | BCM57xx-based Gigabit Ethernet Adapter |

To execute these virtual devices symbolically, a simple harness was manually created for each virtual device. A common library of stub functions was also created for all five virtual devices. The size of this stub library was 481 lines. The respective source code files for these virtual devices ranged from 2099 lines to 4648 lines. The respective harnesses were relatively simple, with about 100 lines. Creation of the harnesses and stub libraries only required several hours a piece. Details about the device models and their harnesses are given in Table II, below.

TABLE II

| Virtual device (VD) | Lines of code in VD | # of functions in VD | Lines of code in harness | # of entry functions in harness |
| --- | --- | --- | --- | --- |
| E1000 | 2099 | 53 | 74 | 4 |
| EEPro100 | 2178 | 70 | 85 | 7 |
| RTL8139 | 3528 | 110 | 111 | 13 |
| PCNet | 2139 | 50 | 112 | 13 |
| Tigeon 3 | 4648 | 34 | 80 | 4 |

To evaluate the performance overhead of our approach, these virtual devices were executed under five configurations which are shown in Table III, below. The experiments were performed on a laptop with an 8-core Intel® Core™ 2 i7 CPU, 8 GB of RAM, 320 GB and 7200 RPM IDE disk drive and running the Ubuntu Linux OS with 64-bit kernel version 2.6.38. The five configurations are divided into two groups based on different loop bound ("LB") and time bound ("TB"). The first group contains configurations 1, 2 and 3, for which the same loop bound and different time bounds were selected. The second group contains configurations 1, 4 and 5, for which different loop bounds and different time bounds were selected. Table III includes the number of different paths followed in simplified results and memory usages (in megabytes) for running the five virtual devices under the five configurations.

TABLE III

| | Config. 1 LB: 1 TB: 150 sec. | | Config. 2 LB: 1 TB: 300 sec. | | Config. 3 LB: 1 TB: 600 sec. | | Config. 4 LB: 2 TB: 300 sec. | | Config. 5 LB: 3 TB: 600 sec. | |
| --- | --- | --- | --- | --- | --- | --- | --- | --- | --- | --- |
| Device | Paths | Memory | Paths | Memory | Paths | Memory | Paths | Memory | Paths | Memory |
| E1000 | 318 | 216 | 545 | 1006 | 601 | 1229 | 427 | 626 | 669 | 1891 |
| EEPro100 | 207 | 41 | 534 | 115 | 1087 | 328 | 469 | 82 | 590 | 126 |

TABLE III-continued

| | Config. 1 LB: 1 TB: 150 sec. | | Config. 2 LB: 1 TB: 300 sec. | | Config. 3 LB: 1 TB: 600 sec. | | Config. 4 LB: 2 TB: 300 sec. | | Config. 5 LB: 3 TB: 600 sec. | |
|---|---|---|---|---|---|---|---|---|---|---|
| Device | Paths | Memory | Paths | Memory | Paths | Memory | Paths | Memory | Paths | Memory |
| RTL8139 | 457 | 76 | 487 | 82 | 503 | 86 | 493 | 82 | 508 | 87 |
| PCNet | 279 | 74 | 424 | 139 | 646 | 262 | 417 | 139 | 601 | 262 |
| Tigeon 3 | 150 | 172 | 150 | 172 | 150 | 172 | 315 | 817 | 366 | 1541 |

With the given loop bounds and time bounds, the above-described techniques achieved exploration of numerous paths with modest memory usage. With the same loop bound, more paths may be explored with a larger time bound. With a larger loop bound, new paths may be followed with multiple loop iterations. However, each path may take different amount time to explore. A path containing multiple loop iterations often takes more time to explore. Therefore, in some test runs, for instance, PCNet, it may be possible to follow relatively few paths with the same time bound but a larger loop bound.

In certain embodiments, the SVD may be loaded into an operating system or may be included in a virtual machine in the same manner as a conventional virtual device. In such embodiments, the interface of the SVD to the operating system or virtual machine may mimic a conventional virtual device interface. However, the internal mechanism for loading an SVD is executed by a symbolic execution engine. The execution of SVD may include two parts: the symbolic execution of its device model and the virtual device interface that connects its device model to the operating system or virtual machine. As the SVD is loaded, both the symbolic device model and the virtual device interface are executed. When the SVD is initialized, for each variable in the device model, a concrete value is assigned if such a value is known; otherwise a symbolic value is assigned.

With SVD loaded in the environment, the developer may execute the device driver in the operating system—the host operating system or a guest operating system on the virtual machine—to interact with the SVD as if it was a physical device. As the SVD receives a command from the driver, it executes the device model symbolically in response to the command. The engine may introduce environment inputs non-deterministically to permit exploration of concurrent execution of device model and device driver. Inputs may be assigned symbolic values so that many concrete input scenarios are explored by the execution. When multiple execution paths are feasible, one path is selected non-deterministically. Instead of a specific device behavior, the SVD exhibits a permissible device behavior non-deterministically selected.

Certain embodiments of the present invention permit a developer to control the behavior of the SVD so that its execution is not completely non-deterministic. The developer may control the SVD behavior by instructing the engine to yield control to the developer at certain decision points rather than making non-deterministic choices. The developer may also control the SVD behavior by assigning different weights to different choices at certain decision point so that the symbolic engine makes its choice according to the weights.

Figure 5:
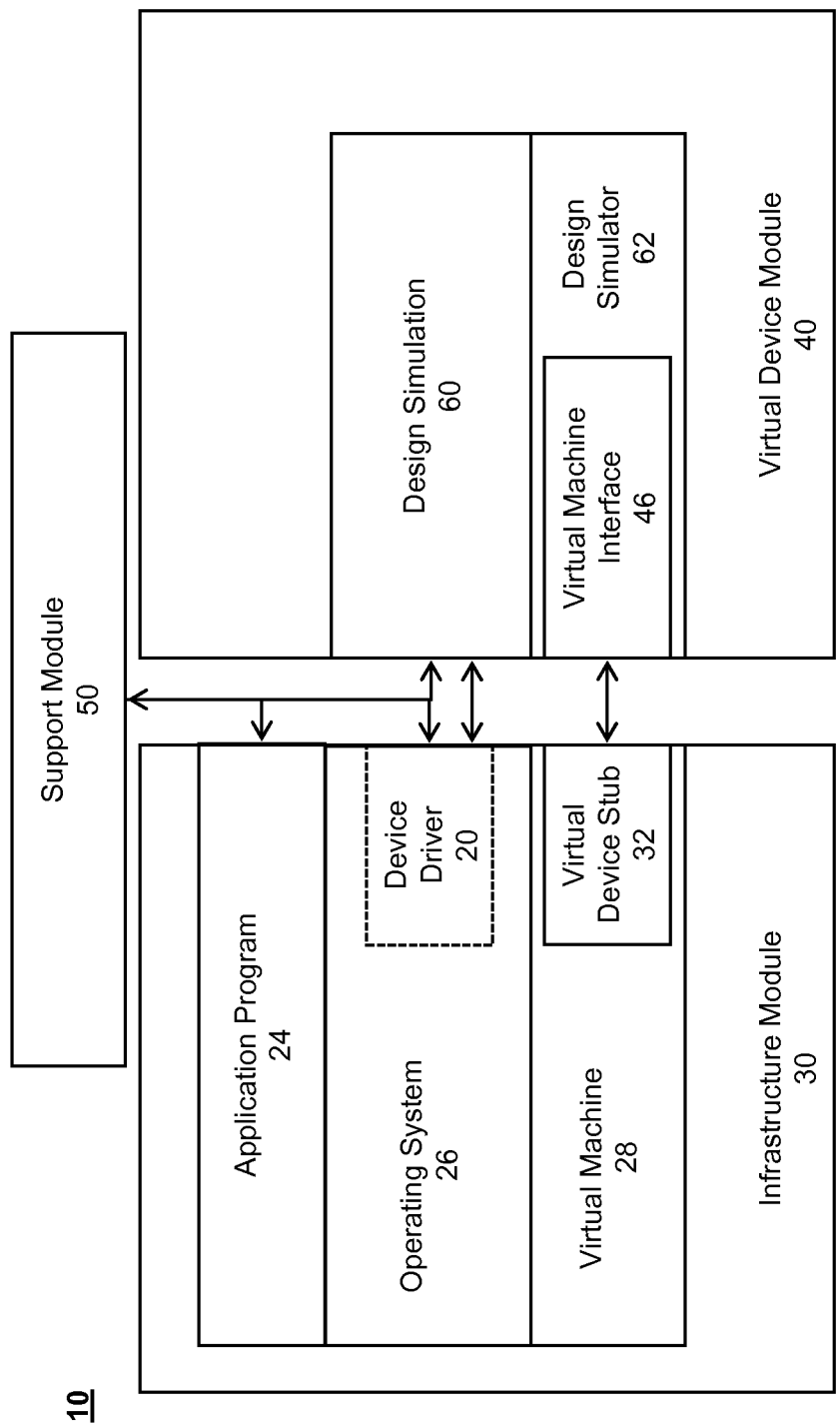
FIG. 5 illustrates an embodiment of a system according to the present invention including an infrastructure module, a virtual device module having a design simulator, and a support module, in accordance with various embodiments.

Certain embodiments of the present invention include a hardware device design-based virtual device as illustrated in FIG. 5. The simulation of a hardware design 60 such as an RTL model, may incorporated into a virtual machine as a virtual device. A device design may be simulated by a design simulator 62 such as a stand-alone hardware simulator, or a design-specific simulation library. The simulation may be configured to communicate with the virtual machine 28 through a virtual device stub component 32. Inputs/outputs may be converted through the virtual device stub interface to the inputs/outputs of the simulated design. The virtual device stub component 32 may be defined to follow the requirements of the virtual machine and the interface protocols of the anticipated device such as PCI and USB. Virtual device inputs/outputs are often defined as software function calls while inputs/outputs to hardware designs vary depending on the hardware design languages used. For example, for RTL designs the inputs/outputs are defined as signals coming in and going out of a hardware module and for SystemC design, the inputs/outputs are defined as function calls, but in different formats from the virtual device function calls. Accordingly, the convertor specification includes inputs/outputs to the virtual device, inputs/outputs to the hardware design, and rules for converting between them.

Figure 6:
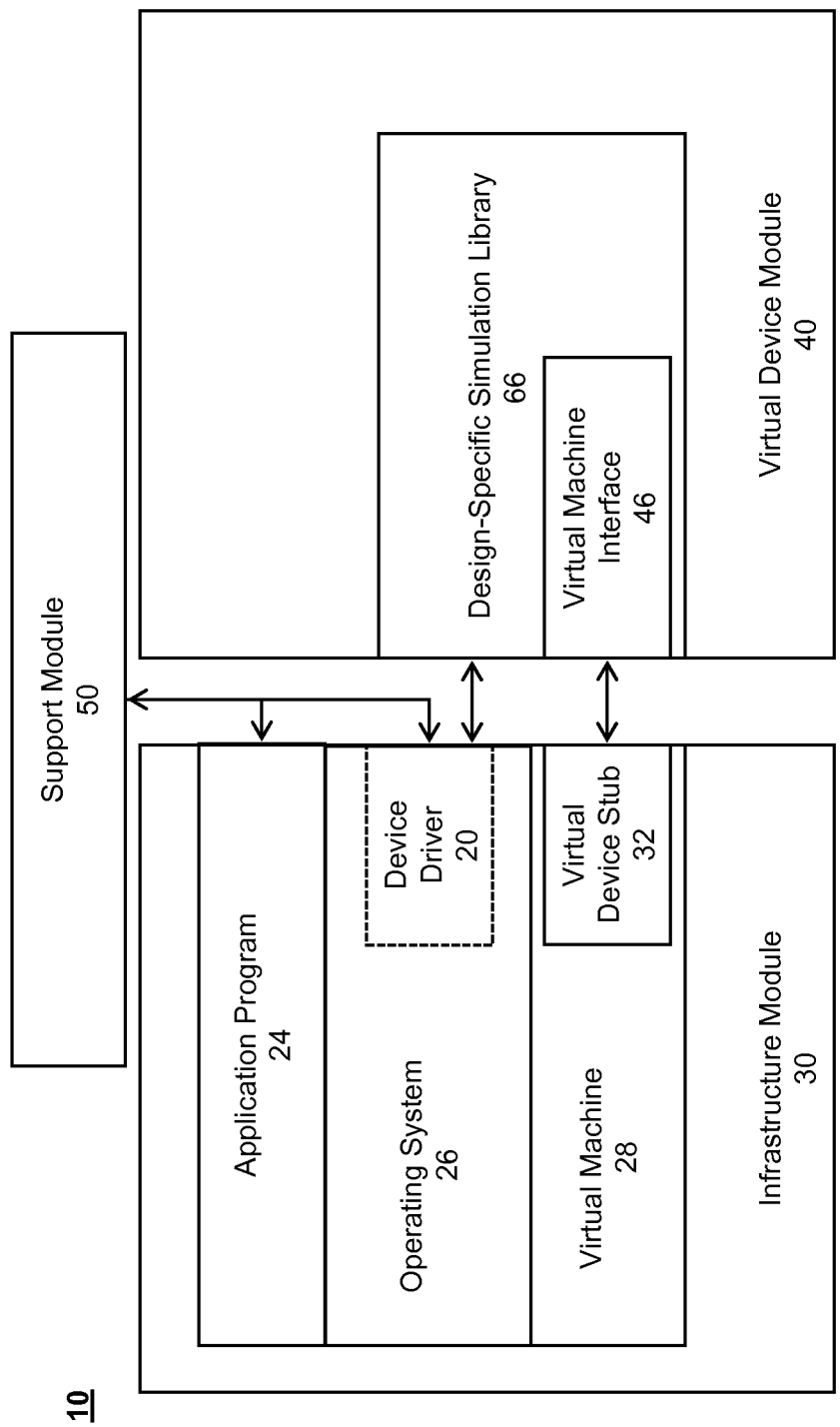
FIG. 6 illustrates an embodiment of a system according to the present invention including an infrastructure module, a virtual device module having a design-based virtual device, and a support module, in accordance with various embodiments.

The hardware design is compiled into a design-specific virtual device 66 such as a C/C++ module and the module is packaged as a virtual device and loaded into the virtual machine module 40, as illustrated in FIG. 6.

Once the HD-VD is specified, the necessary software programs are automatically generated that implement the convertor, connect the virtual device stub interface to the convertor, and connect the convertor to the interface of the hardware design through the facilities of the design simulators 62. For a design simulator 62 such as Mentor Graphics ModelSim which operates as a stand-alone system, the convertor is split into two parts: the virtual device side and the simulator side. Each side of the convertor is implemented as a dynamically linked library, loaded by the virtual device environment and the hardware simulator respectively. The two libraries communicate with each other at run time to realize the input/output conversion.

The virtual device side library may capture the input function calls to the virtual device and communicates the type of calls and the parameters to the simulator side library, which then generates the input signals/function calls to the hardware design accordingly. The simulator side library captures the output signals/function calls from the hardware design and communicates the types of signals and their values or the types of function calls and their parameters to the virtual device side library, which then invokes the corresponding virtual device output function calls with the properly formulated parameters. For a hardware simulator such as Verilator which compiles the hardware design into a software program that may be utilized as a library, the convertor is combined with the simulation program to create a dynamically linked library. This library is loaded by the virtual device environment. As the stub virtual device receives a virtual device input, a corresponding function of the convertor is called and the parameters of the virtual device input are passed onto the convertor. In this convertor function, those parameters are analyzed and the proper sequence of functions in the simulator program is called with the properly formulated parameters. When the simulator program is ready to output, it invokes a function in the convertor which transforms the output from the simulated design into the invocation to the corresponding virtual device output functions.

The HD-VD may be loaded into an operating system or a virtual machine. For a stand-alone simulator such as Model-Sim, the simulator is first started and the hardware design loaded. As it starts, the simulator side library is loaded. Then, the virtual device stub is loaded by the virtual device environment. As the virtual device stub is loaded, the virtual device-side library may also be loaded. As this library is loaded, it synchronizes with the simulator side library. Once these libraries are synchronized and the virtual device stub recognized by the operating system or the virtual machine, the loading of HD-VD is complete and ready to be utilized by the device driver. In this setup, the virtual device environment and the simulator are two separate processes and they communicate through inter-process communication. For a simulator generated as a library, as the virtual device stub is loaded by the virtual device environment, the dynamically linked library is also loaded with the virtual device stub. Once the virtual device stub is recognized by the operating system, the loading of HD-VD is complete and ready to be utilized by the device driver. In the setup, the simulator is part of the virtual device environment and often executed in a thread.

Once the HD-VD is recognized by the operating system or virtual machine, it is treated as if it was a physical device. The development and validation of device driver may be conducted on top of the HD-VD the same way as the physical device. Since the HD-VD is the simulated hardware design, as the device driver interacts with it, all functionalities of the simulator may be utilized to monitor its status (such as internal states), control its behaviors, and log its execution traces.

Embodiments of the present invention include an integrated development environment configured to provide automation through the lifecycle of SVDs including creation, analysis, deployment, run-time control, and testing. Such an integrated development environment is configured to provide a number of functions automatically. For example, it may permit: (1) creation, compilation, and debugging of SVDs, (2) SVD transaction analysis: enumerating possible types of transactions through SVDs, (3) push-a-button deployment of SVDs into virtual machines, (4) run-time control of SVDs: breakpoint, step-through, in-situ path prediction, and randomized execution, (5) incorporation of HD-VD into SVD, and (6) SVD test coverage report and automatic test generation.

Figure 7:
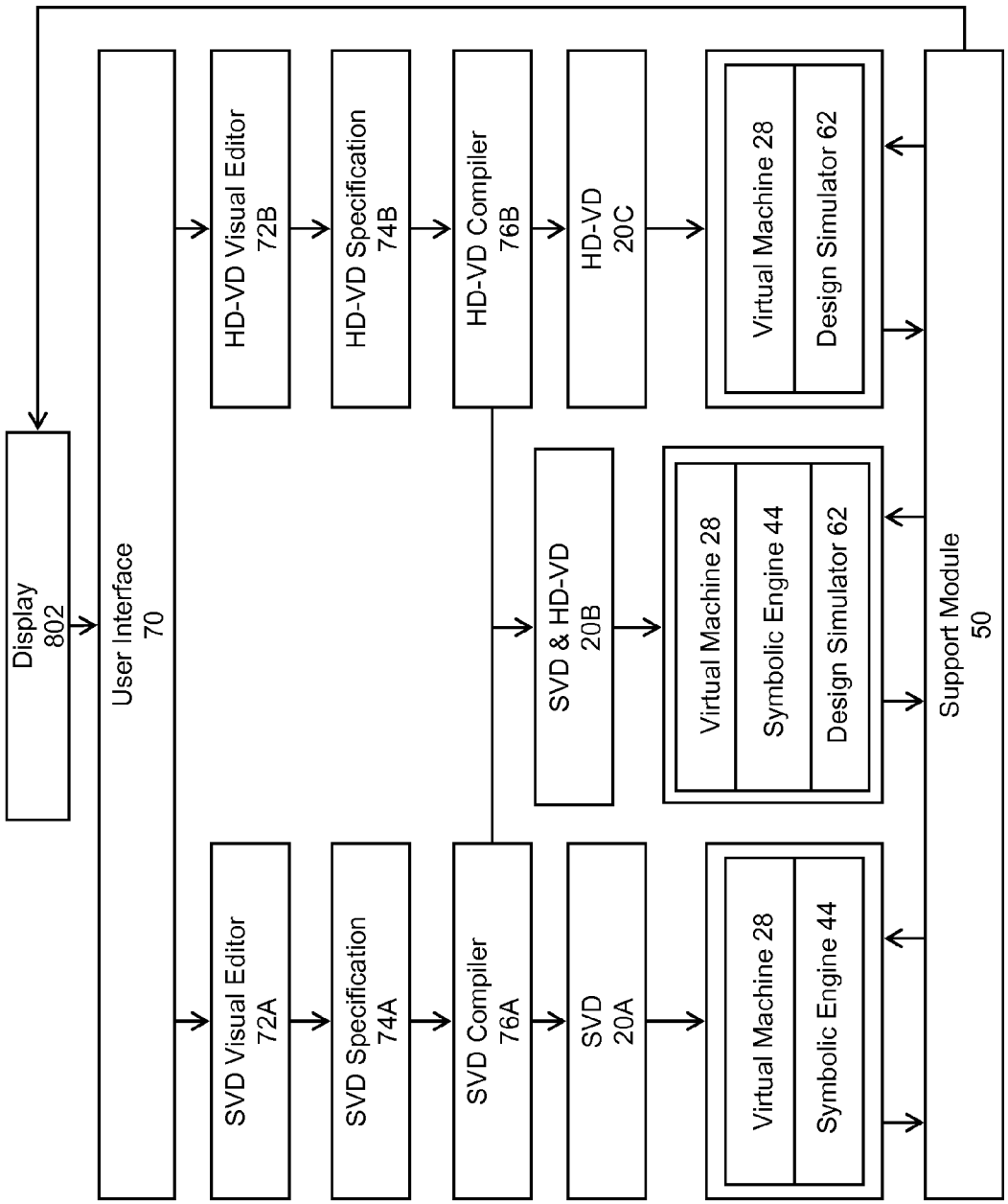
FIG. 7 illustrates a flowchart of an integrated development environment, in accordance with various embodiments.

An embodiment of an integrated development environment including three workflows (e.g., SVD workflow, HD-VD workflow, and SVD+HD-VD workflow) is illustrated in FIG. 7. All the three workflows can be initiated from a user interface 70 such as a VD Studio graphical user interface. A user interface 70 may be viewed on an input/output display interface 802. In certain embodiments, a user interface 70 is used to invoke a visual editor 72 for each corresponding workflow, namely SVD visual editor 72A and/or HD-VD visual editor 72B. The user may create and configure SVD and HD-VD through the visual editor 72 to create an SVD specification 74A or an HD-VD specification 74B. Once the SVD specification 74A and/or HD-VD specification 74B is completed, it is compiled into a SVD 20A and/or HD-VD 20B automatically using a compiler 76A, 76B. The SVD 20A and HD-VD 20B are then deployed into an environment such as a virtual machine 28 or operating system 26, or an embodiment of a virtual device module 40 that may include a symbolic engine 44 and/or a design simulator 62. As the simulators execute, the SVD 20A and HD-VD 20B traces are captured and send to the bug report and coverage report generator in the support module 50. Test cases can also be generated and provided to the simulators to apply.

Figure 8:
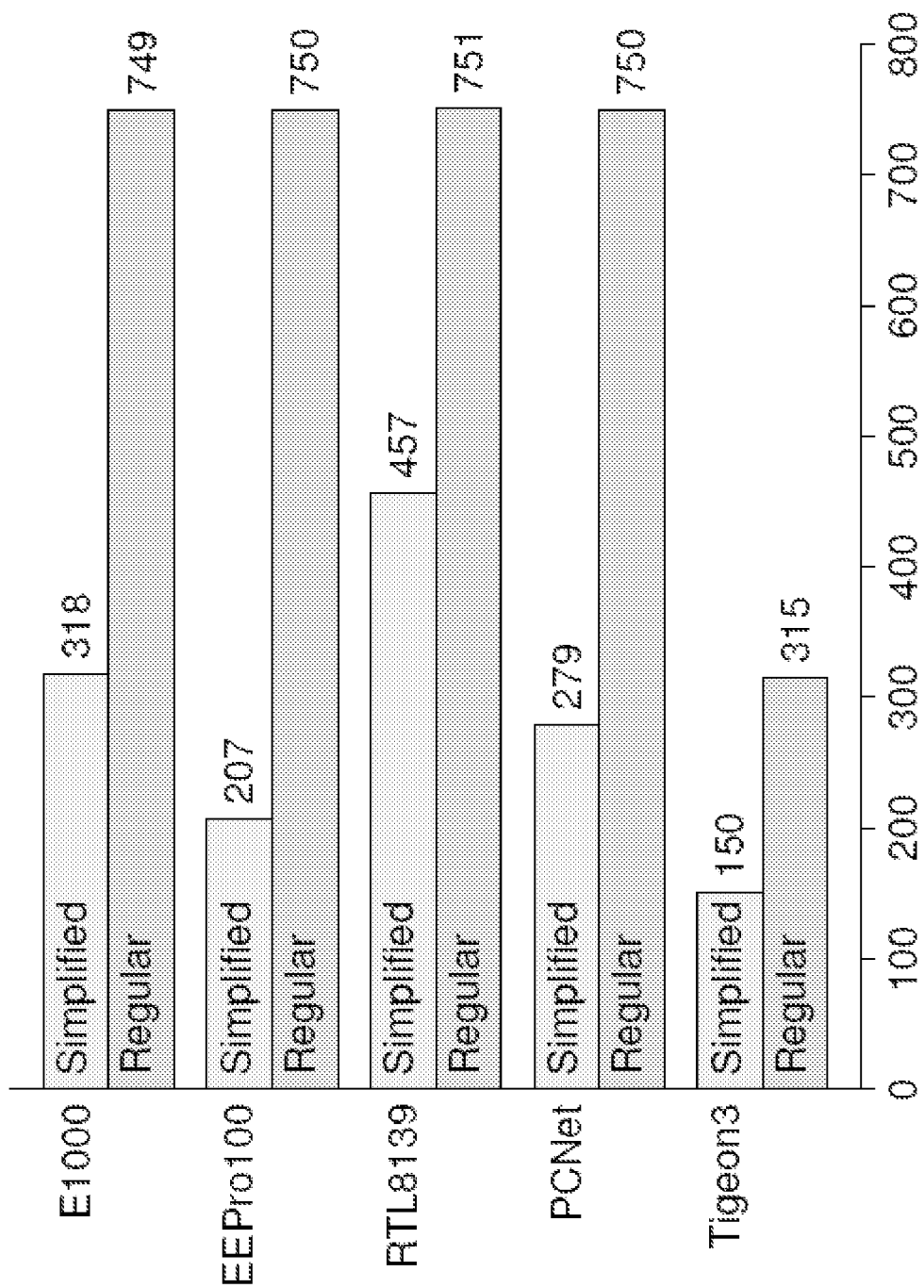
FIG. 8 depicts example performance results that may be reported in simplified and regular reports, in accordance with various embodiments, in accordance with various embodiments.

FIG. 8 depicts example simplified and regular performance results achieved in the experiment described above conducted on the five virtual devices representing the five network adaptors. In this example, the data was collected using Configuration 1 (loop bound=1; time bound=150 seconds) of Table III. It can be seen that the number of followed paths reported is reduced dramatically by eliminating duplicative traces.

As noted above, in various embodiments, virtual devices may be used to develop a device driver for future use with a later-developed physical device. However, virtual devices may behave differently from physical devices due to design and implementation errors, misunderstanding of design specifications, and even the different level of details. It therefore may be beneficial to assess the conformance of a physical device with its virtual device and discover the inconsistencies.

Figure 9:
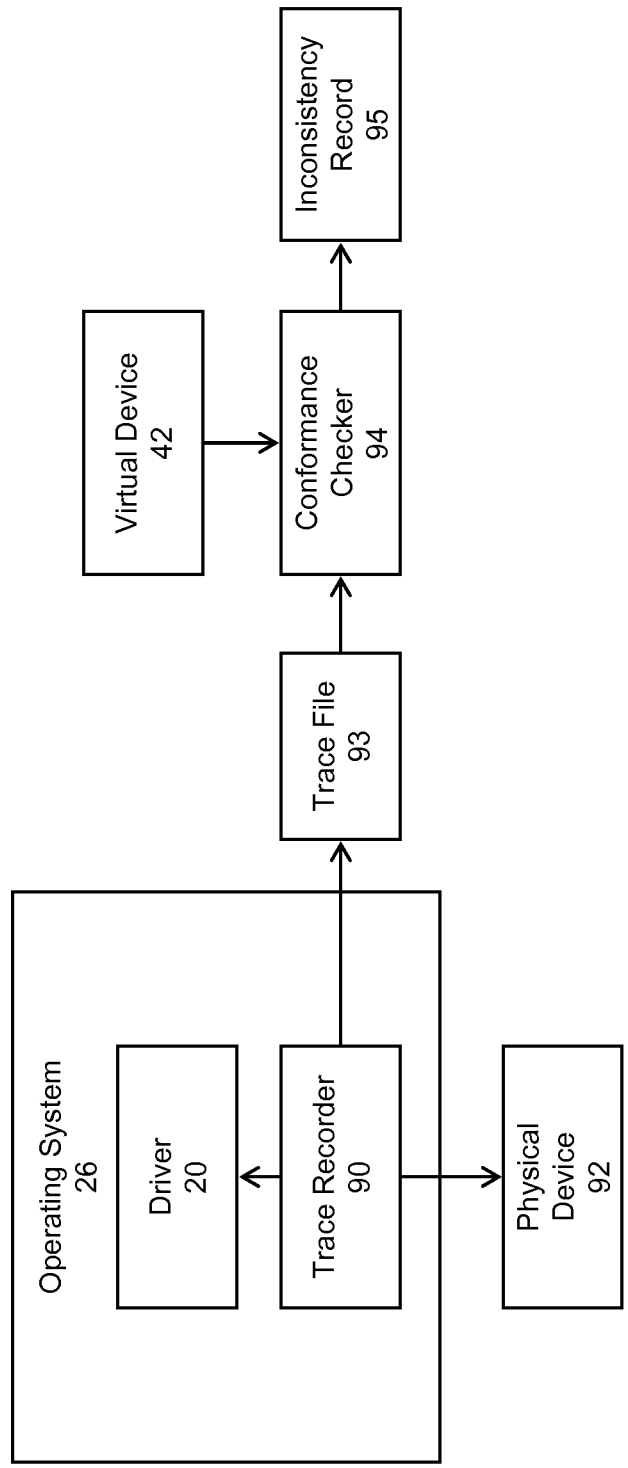
FIG. 9 illustrates an embodiment of the present invention that implements a trace recorder and conformance checker, in accordance with various embodiments.

Accordingly, in various embodiments, conformance assessment of a hardware device with its corresponding virtual device may be facilitated, e.g., to localize any inconsistencies, as illustrated in FIG. 9. This may permit symbolic execution of a virtual device with the same driver request sequence to a corresponding physical device, and assessment of whether the physical device and its virtual device counterpart behave consistently. For example, in various embodiments, the driver requests sent to the physical device may be recorded, the virtual device may be symbolically executed using the recorded request sequence, and the observable states of the virtual device and physical device may be analyzed for inconsistencies.

Conformance assessment may address the limited observability of physical devices. A physical device may have internal states which are difficult to observe. Moreover, the outside environment inputs of the physical device may also be difficult to capture. However, using disclosed techniques, physical device state transitions on the virtual device may be replayed to model the internal states and outside environment inputs using variables with symbolic values. In this way, symbolic execution covers their possible values.

Conformance assessment may not suffer from the complexity of symbolic execution. As noted above, the complexity of symbolic execution may be high due to path explosion. As will be explained further below, to reduce resulting time and resource overheads, a technique referred to herein as "adaptive concretization" may be employed to eliminate unnecessary symbolic variables, a major factor contributing to the symbolic execution complexity.

In various embodiments, conformance assessment may be implemented by a trace recorder 90 and a conformance checker 94, as illustrated in FIG. 9. Trace recorder 90 may be configured to capture a driver request sequence to physical device 92 and the physical device state before each driver request is issued. A sequence of such request-state pairs may be referred to as a "device trace." Trace recorder 90 may produce a trace file 93 that includes the captured device traces.

In some embodiments, trace recorder 90 may record every driver request. In other embodiments, trace recorder 90 may selectively record certain driver requests. In some embodiments, trade recorder 90 may only be capable of capturing a subset of all possible variables that together form a physical device state. For example, in various embodiments, some registers of physical device 92, such as interface registers, may be accessible to trace recorder 90. Other registers, such as internal registers, may not be accessible to trace recorder.

In some such embodiments, conformance checker 94 may assign symbolic values to the inaccessible registers (or more generally, variables). The resulting physical device state may be referred to as a "partial state."

In various embodiments, conformance checker 94 may be configured to execute virtual device 42 with the recorded driver request sequence from trace file 93, determine whether physical device 92 and virtual device 42 are consistent, and output an inconsistency record 95 if inconsistencies are found.

In various embodiments, conformance assessment may include initializing a state of virtual device 42 by assigning the observable state of physical device 92 before virtual device 42 takes a first driver request. Then, virtual device 42 may be symbolically executed upon a driver request from the device trace. After virtual device 42 consumes the driver request, a consistency between virtual device 42 and physical device 92 may assessed. If an inconsistency is found, it may be recorded, and virtual device 42 and physical device 92 may be synchronized by setting the physical device state as the virtual device state. Otherwise, virtual device 42 may be synchronized by further constraining the virtual device states with the corresponding register values in the physical device state. Then, conformance checker 94 may receive the next driver request and repeat the executing, checking, and recording steps. The conformance checking process may terminate when it completes a trace file, e.g., by finishing the last driver request in the sequence.

In various embodiments, conformance checker 94 may include a state checker component (not shown), which may receive a partial state of physical device 92 and a set of symbolic states of virtual device 42 as inputs. As noted above, the partial state may be a symbolic state that may contain concrete values (e.g., for accessible registers) and symbolic values (e.g., for inaccessible registers) that together form all possible states of physical device 92. Each symbolic state of virtual device 42 may contain a set of possible virtual device states. An inconsistency may be discovered if there is no intersection between the partial state and any symbolic state of the virtual device.

An algorithm that may be implemented in the state checker component may, in various embodiments, operate on a partial state P and the set of symbolic states of the virtual device, G. G may contain several symbolic states, $S_1, S_2, \ldots, S_m$. For each $S_i \in G$, $0 < i \leq m$, $P \cap S_i$ may be computed. If for all $S_i \in G$, $P \cap S_i = \emptyset$, an inconsistency may exist between virtual device 42 and physical device 92.

In order to compute $P \cap S_i$, expressions of P and $S_i$ may be constructed. Assume that the device state has the following variables: $var_1, var_2, \ldots, var_n$. The values of the state variables of P may be defined as $Val(var_1)_P, Val(var_2)_P, \ldots Val(var_n)_P$. In various embodiments, the expression of P may be constructed as Expr (P): $(van == Val(var_1)_P) \wedge (var_2 == Val(var_2)_P) \wedge \ldots \wedge (var_n == Val(var_n)_P)$. Similarly, assuming that the constraints of $S_i$ is expressed as $Cont(S_i)$, the expression of $S_i$, $Expr(S_i)$, may be constructed as follows: $(var_1 == Val(var_1)_{Si}) \wedge (var_1 == Val(var_2)_{Si}) \wedge \ldots \wedge (van == Val(var_n)_{Si}) \wedge Cont(S_i)$. By constructing the expressions of P and $S_i$, testing whether $P \cap S_i$ is non-empty may be transformed to testing whether Expr $(P) \wedge Expr(S_i)$ may be satisfied. An example algorithm for implementing this process is below:

```
NextState = NULL
FLAG = FALSE
```

```
Expr(P) = TRUE
for all var_i of P do
    Expr(P) = Expr(P) ∧ (var_i == Val(var_i)_P)
end for
for all S_i ∈ G do
    Expr(S_i) = 1
    for all var_i of S_i do
        Expr(S_i) = Expr(S_i) ∧ (var_i == Val(var_i)_Si)
    end for
    Expr(S_i) = Expr(S_i) ∧ Cont(S_i)
    if Expr(S_i) ∧ Expr(P) is satisfied then
        NextState = NextState ∪ (S_i ∩ P)
        FLAG = TRUE
        break
    end if
end for
return FLAG
```

Suppose a device state contains two variables, a and b. In the partial state P, there may be only one variable, a, which has the concrete value of 3. The symbolic value $\beta$ may represent the variable b. In the set of symbolic states of the virtual device, there may be a symbolic state S $\{a == \alpha, b == \beta', \alpha <= 5, \beta' < 10\}$. The expression of the state P, Expr(P) may be $(a == 3) \wedge b == \beta)$. The expression of S, Expr(S) may be $(a == \alpha) \wedge (b == \beta') \wedge (\alpha <= 5) \wedge (\beta' < 10)$. Since the expression Expr(P) $\wedge$ Expr(S) is satisfied, $P \cap S \neq \emptyset$. Thus, the physical device state and the virtual device state may be considered consistent.

After conformance checking, synchronization steps may be employed. In various embodiments, if an inconsistency was found during conformance testing, the physical device state may be set as the virtual device state. Otherwise, the new virtual device state may be a union of all non-empty intersection of P and $S_i$, since this union contains the possible virtual states consistent with the physical device state.

As described above, certain embodiments of the present invention include a harness. A harness may be used in association with the conformance checking process as well. Non-deterministic choices are used to enable non-determinism in virtual devices such as QEMU virtual devices. Some input variables of the virtual device have unknown values. For example, outside environment inputs of the virtual device are unknown, as they are not captured from the physical device. These variables are initialized with symbolic values, so that symbolic execution can cover the possible inputs from the outside environment. Capturing the hardware concurrency requires non-deterministic executions of a loop where the module functions are invoked non-deterministically. Such a loop is defined as the main loop of an execution harness. Theoretically, symbolic execution needs to execute the loop until all states are explored. However, this is not realistic for some embodiments, as fix-point computation in symbolic execution is expensive.

In various embodiments, symbolically executing a module function of a virtual device often may have the same effect or a similar effect on the device state as executing it only once. For example, receiving a packet and receiving multiple packets usually lead to the same effect on the device registers: an interrupt is fired by setting one bit in the interrupt register. Therefore, to efficiently capture the concurrency of module functions, the loop bound may be set equal to the number of the module functions in the execution harness. This implementation of non-deterministic interleaving may cover most of the device concurrency. Nevertheless, it is possible to have false negatives, as a boundary for the main loop may be set instead of non-deterministic many executions.

False negatives may result in certain embodiments because the non-deterministic interleaving by executing the main loop of the execution harness is bounded to a fixed number of times or because symbolic execution executes a loop in the virtual device that is not statically bounded a fixed number of times. However, such false negatives are typically low because the loops in the virtual device and the main loop in the execution harness are bound to reflect physical device usage and accordingly cover most of the virtual device behaviors.

In various embodiments, a conformance checking embodiment may be implemented as a kernel library such as a Linux kernel library. Linux device drivers may call kernel API functions to manipulate devices. For example, a driver may call a function "writel" to write a long integer to a device register. The source code of these kernel functions may be instrumented so that the trace recorder is invoked to record the driver requests once the driver calls these functions to manipulate the device.

A conformance checking embodiment also may include a symbolic execution engine to symbolically execute the virtual device. Before execution, a compiler such as an llvm-gcc compiler may be used to translate the virtual device into an intermediate representation, such as LLVM bitcode. A symbolic execution engine such as KLEE may be modified for state checking. The symbolic execution engine also may be modified to remove certain functions not used in certain embodiments, for example, generating test cases.

As was the case with test case generation, symbolic execution during conformance checking may be vulnerable to path explosion. To reduce symbolic execution overhead, in various embodiments, a technique known as "adaptive concretization" may be used to eliminate unnecessary symbolic variables. When conformance checking reveals that a virtual device state is consistent with a corresponding physical device, that may suggest that, during execution of the virtual device, few if any of the symbolic variables of the virtual device were accessed. In fact, the values of the symbolic variables may not affect the conformance checking results most of the time. Therefore, in various embodiments, symbolic symbols may be adaptively concretized while introducing relatively few false negatives.

Figure 10:
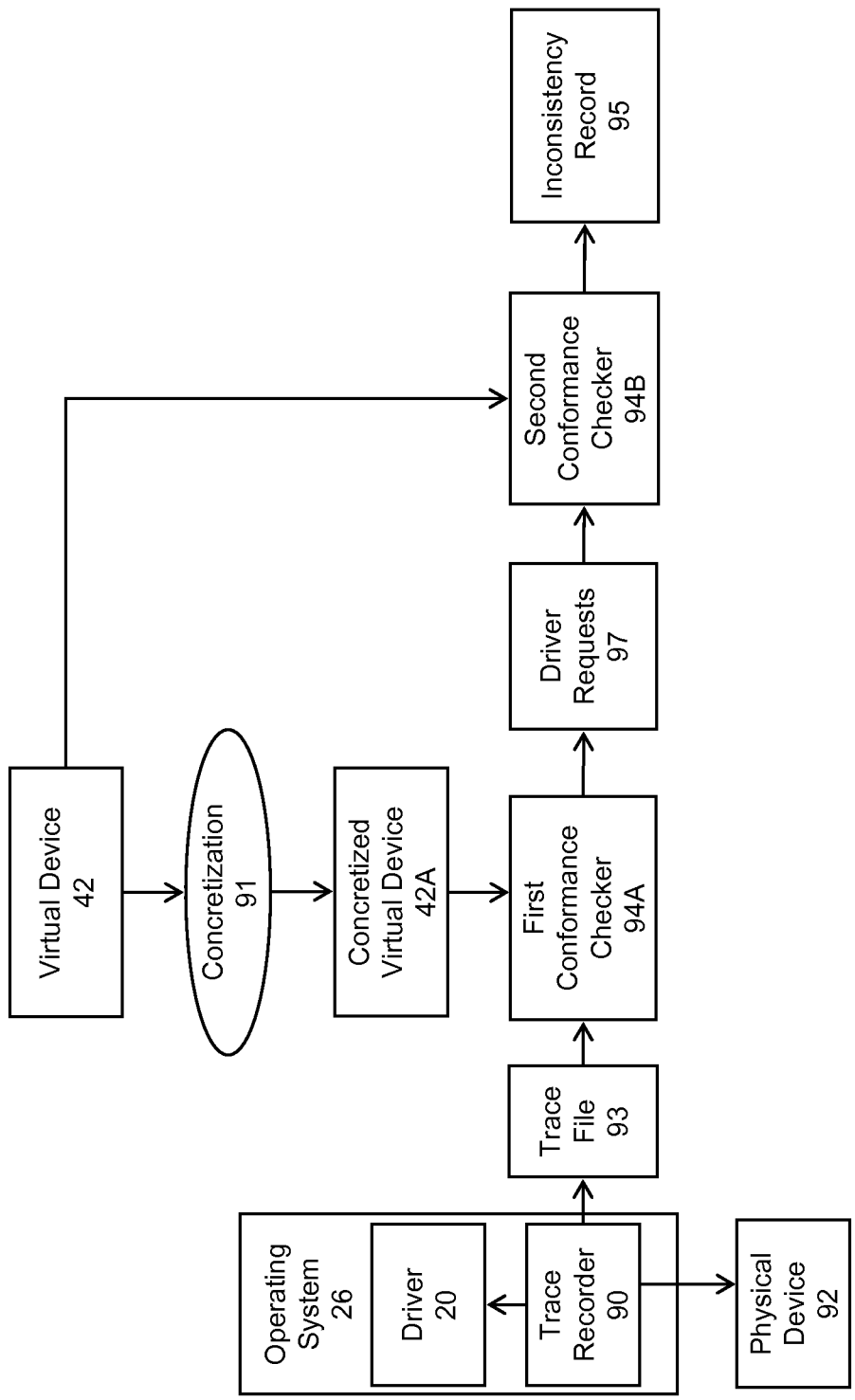
FIG. 10 illustrates an embodiment of the present invention including a flowchart for implementation of adaptive concretization, in accordance with various embodiments, in accordance with various embodiments.

An example adaptive concretization process is illustrated in FIG. 10. In various embodiments, a first round of the adaptive concretization may be referred to as a "concretizing mode." In this mode, virtual device 42 may be concretized at block 91, e.g., by directly assigning concrete, random values to its symbolic variables. Conformance assessment similar to that illustrated in FIG. 9 may then be conducted, e.g., by a first conformance checker 94A. As input, first conformance checker 94A may use a concretized virtual device 42A, rather than general virtual device 42, as well as trace file 93. In various embodiments, first conformance checker 94A may be configured to output driver requests 97 that reveal inconsistencies between concretized virtual device 42A and its counterpart physical device 92.

In various embodiments, a second round of adaptive concretization may be referred to as a "symbolic mode." In such a mode, a second conformance checker 94B may be configured to perform a second round of conformance assessment using the original virtual device 42 (e.g., with symbolic variables). In various embodiments, second conformance checker 94B may be configured to output inconsistency records 95. Because second conformance checker 94B may only perform conformance assessment using the driver requests output by first conformance checker 94A in the first round of conformance checking (which as noted above are only those request that lead to inconsistencies), complexity and resource usage of symbolic execution may be reduced. Inconsistencies discovered by second conformance checker 94B may be output in an inconsistency record 95 as inconsistencies between the virtual device and the physical device. In various embodiments, inconsistencies in inconsistency record 95 may include virtual device bugs and/or physical device bugs. By using adaptive concretization, enumerating unnecessary states is avoided. This can reduce symbolic execution overheads significantly.

In embodiments in which the virtual device is concretized using adaptive concretization, a state checking algorithm of the concretizing mode may be simplified. The state checker in the concretizing mode may check concrete states that do not have any variables with symbolic values and any symbolic constraints. Accordingly, the state checker may not need to construct symbolic expressions for each state or invoke the solver to solve constraints. Instead, the state checker may be configured to implement an algorithm, an example of which is shown below, to determine whether the observable states of the physical device are equal to the corresponding states of the virtual device. In the example below, "InterfaceRegisters" may represent a set of interface registers variables located in the range of selective capturing:

```
NextState = NULL
for all S_i ∈ G do
    FLAG = TRUE
    for all var_j ∈ InterfaceRegisters do
        if Val(var_j)_P ≠ Val(var_j)_Si then
            FLAG = FALSE
            break
        end if
    end for
    if FLAG ≠ TRUE then
        continue
    else
        NextState = P
        return TRUE
    end if
end for
return FALSE
```

Three real-world network adaptors and their corresponding virtual devices (provided with QEMU) were assessed for conformance using techniques described herein.

TABLE IV

DEVICE USED FOR CONFORMANCE ASSESSMENT EXPERIMENT

| Device | VD Size | Description |
|---|---|---|
| Intel e1000 | 88 KB | Intel Gigabyte Ethernet Adaptor |
| Broadcom bcm5751 | 184 KB | Broadcom Gigabyte Ethernet Adaptor |
| Intel eepro100 | 72 KB | Intel Megabyte Ethernet Adaptor |

Figure 11:
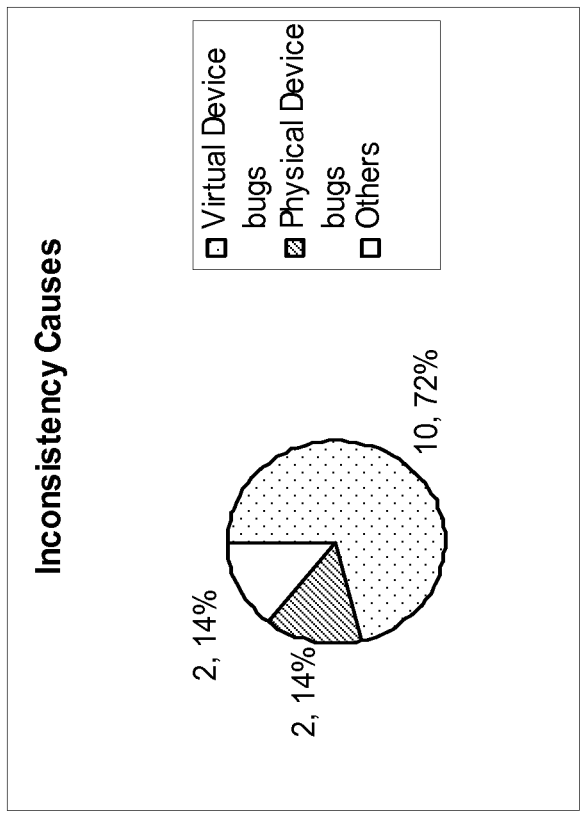
FIG. 11 illustrates example performance results from conformance testing, in accordance with various embodiments.
Figure 11:
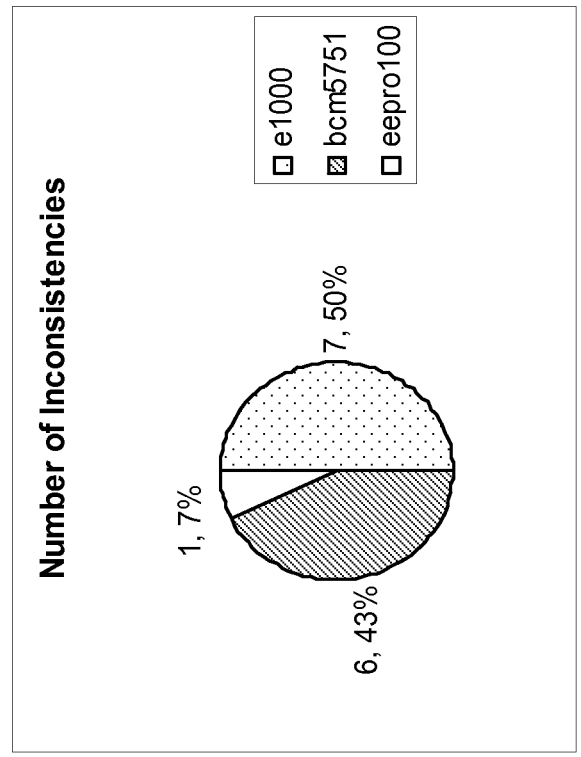

Conformance assessment was performed using the physical devices and corresponding virtual devices described in TABLE IV above. As shown in the charts of FIG. 11, fourteen inconsistencies were found between the three network adapters and their virtual device counterparts: seven in the e1000, six in the bcm5751, and one in the eepro100. By analyzing the inconsistency reports generated by conformance checker 94, ten bugs were discovered in the virtual devices and two bugs were discovered in the silicon devices. As the results in FIG. 11 demonstrate, most of these inconsistencies are caused by the bugs of the virtual devices. This may be attributable to the facts that these network adaptor devices are stable products which have gone through extensive testing and bug-fixing procedures, and that their virtual devices may not have been as rigorously tested. However, such virtual device bugs may nonetheless appear in physical device prototypes, particular during earlier stages of hardware development, since these bugs are common violations of hardware designs. Accordingly, the conformance assessment described herein may be implemented during various hardware development stages, which may lead to the discovery of many inconsistencies caused by bugs in physical device prototypes.

We evaluate the time usages in the two rounds of conformance checking respectively. Table V, below, shows the results. "Conc." and "Symb." denote the concretizing mode and the symbolic mode respectively. Values in the "Time Usage" column are the average time usages for the conformance checker processing every one hundred driver requests of the device trace collected under the different test cases. The time usages of both concretizing mode and symbolic mode are not so great as to render the technique useless. However, if adaptive concretization is not used while processing the driver requests, the time usages may be quite large. For example, take e1000 and "Reset NIC" test case. Using a native, non-adaptive concretized approach, the time usage is 2363.41 seconds. In contrast, the time usages achieved using adaptive concretization described herein, shown in Table V, are lower, e.g., 8.22 seconds under the concretized mode and 119.6 seconds under the symbolic mode. These results demonstrate that adaptive concretization can significantly reduce the time usage of symbolic execution. Memory utilizations may be evaluated in a similar way time usages.

TABLE V

| Device | Test cases | Time Usage (seconds) | | Memory Usages (MB) | |
|---|---|---|---|---|---|
| | | Conc. | Symb. | Conc. | Symb. |
| e1000 | Reset NIC | 8.22 | 119.60 | 122 | 313 |
| | Send Pkts | 8.35 | 225.91 | 137 | 336 |
| | Chg. MTU | 8.28 | 166.49 | 133 | 302 |
| bcm5751 | Reset NIC | 11.21 | 89.16 | 135 | 335 |
| | Send Pkts | 13.11 | 251.68 | 128 | 302 |
| | Chg. MTU | 6.8 | 203.5 | 132 | 302 |
| eepro100 | Reset NIC | 8.02 | 127.32 | 120 | 310 |
| | Send Pkts | 8.11 | 161.32 | 122 | 342 |
| | Chg. MTU | 8.91 | 91.52 | 122 | 301 |

Figure 12:
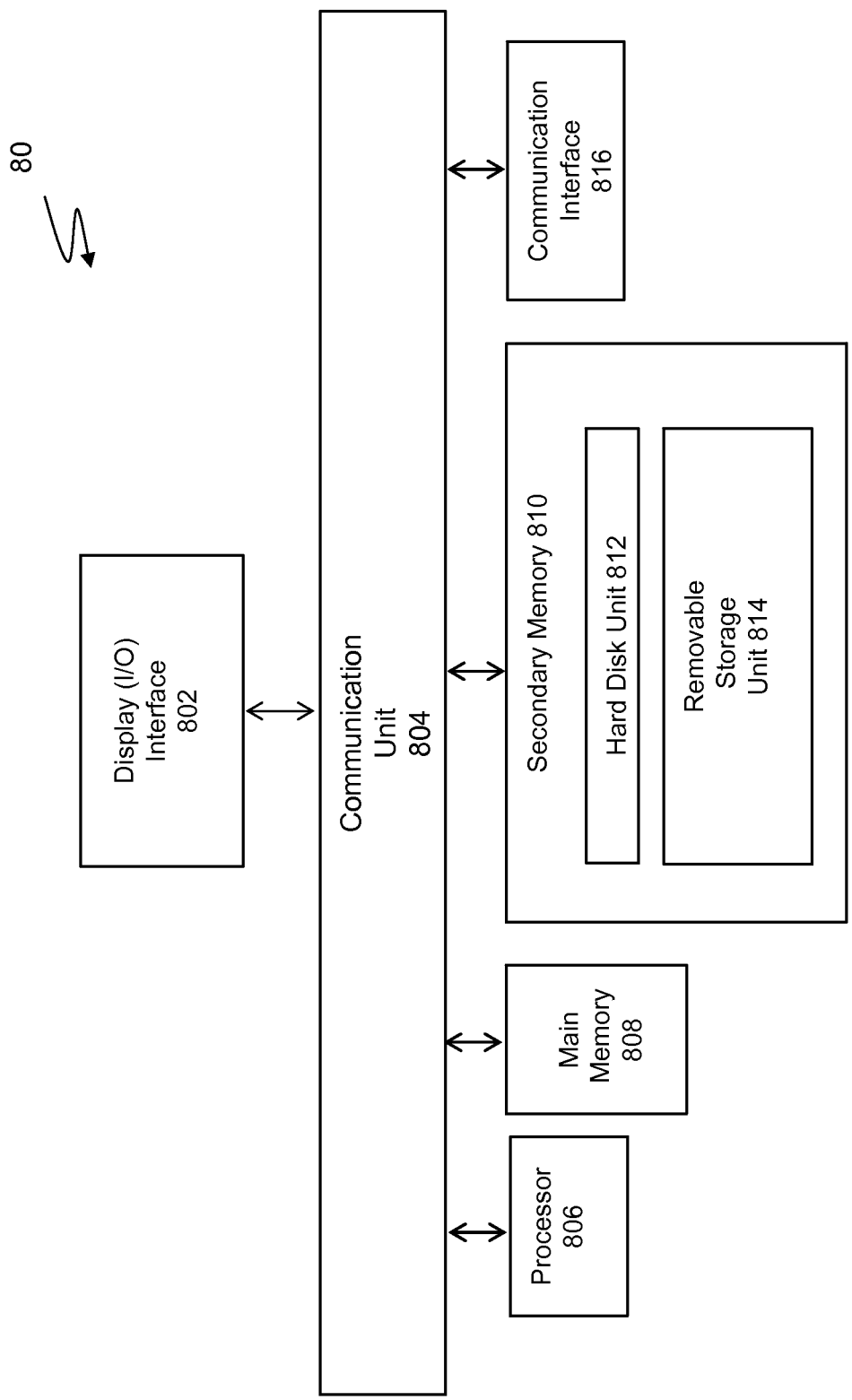
FIG. 12 illustrates an embodiment of an exemplary computer system, in accordance with various embodiments.

FIG. 12 illustrates an exemplary computer system 80 that may be used to implement the system and methods according to the invention. One or more computer systems 80 may carry out the methods presented herein as computer code.

Computer system 80 includes an input/output display interface 802 connected to communication unit 804—such as a bus —, which forwards data such as graphics, text, and information, from the communication unit 804 or from a frame buffer (not shown) to other components of the computer system 80. The input/output display interface 802 may be, for example, a keyboard, touch screen, joystick, trackball, mouse, monitor, speaker, printer, any other computer peripheral device, or any combination thereof, capable of entering and/or viewing data.

A computer system 80 includes one or more processors 806, which may be a special purpose or a general-purpose digital signal processor that processes certain information. Computer system 80 also may include a main memory 808, for example, random access memory ("RAM"), read-only memory ("ROM"), mass storage device, or any combination thereof. Embodiments of a computer system 80 may also include a secondary memory 810 such as a hard disk unit 812, a removable storage unit 814, or any combination thereof. Computer system 80 may also include a communication interface 816, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 808, secondary memory 810, communication interface 816, or a combination thereof, function as a computer usable storage medium, otherwise referred to as a computer readable storage medium, to store and/or access computer software including computer instructions. For example, computer programs or other instructions may be loaded into the computer system 80 such as through a removable storage device, for example, a floppy disk, ZIP disks, magnetic tape, portable flash drive, optical disk such as a CD or DVD or Blu-ray, Micro-Electro-Mechanical Systems ("MEMS"), nanotechnological apparatus. Specifically, computer software including computer instructions may be transferred from the removable storage unit 814 or hard disc unit 812 to the secondary memory 810 or through the communication unit 804 to the main memory 808 of the computer system 80.

Communication interface 816 allows software, instructions and data to be transferred between the computer system 80 and external devices or external networks. Software, instructions, and/or data transferred by the communication interface 816 are typically in the form of signals that may be electronic, electromagnetic, optical or other signals capable of being sent and received by the communication interface 816. Signals may be sent and received using wire or cable, fiber optics, a phone line, a cellular phone link, a Radio Frequency ("RF") link, wireless link, or other communication channels.

Computer programs, when executed, enable the computer system 80, particularly the processor 806, to implement the methods of the invention according to computer software including instructions.

The computer system 80 described herein may perform any one of, or any combination of, the steps of any of the methods presented herein. It is also contemplated that the methods according to the invention may be performed automatically, or may be invoked by some form of manual intervention.

The computer system 80 of FIG. 10 is provided only for purposes of illustration, such that the invention is not limited to this specific embodiment. It is appreciated that a person skilled in the relevant art knows how to program and implement the invention using any computer system.

The computer system 80 may be a handheld device and include any small-sized computer device including, for example, a personal digital assistant ("PDA"), smart handheld computing device, cellular telephone, or a laptop or netbook computer, hand held console or MP3 player, tablet, or similar hand held computer device, such as an iPad®, iPad Touch® or iPhone®.

While the foregoing written description of the invention enables one of ordinary skill to make and use what is considered presently to be the best mode thereof, those of ordinary skill will understand and appreciate the existence of variations, combinations, and equivalents of the specific embodiments, and examples herein. The invention should therefore not be limited by the above described embodiments and examples, but by all embodiments within the scope and spirit of the invention.

What is claimed is:

1. An apparatus comprising a processor for assessment of conformance of a virtual device with a physical device, the processor to:
   - employ, by the processor, a trace recorder configured to record a sequence of driver requests sent to the physical device and a sequence of physical device interface states before each driver request is issued,
   - apply, by the processor, a conformance checker configured to execute the virtual device with the sequence of driver requests from the trace recorder,
   - compare, by the processor, results from a trace of the physical device and the virtual device, and
   - deliver, by the processor, an output report based on the comparison, the report including information indicative of identified inconsistencies between the virtual device and the physical device, or a lack thereof.

2. At least one non-transitory computer-readable storage medium comprising instructions that, in response to execution of the instructions by a computing device, enable the computing device to perform conformance assessment of a virtual device with a physical device, the conformance assessment comprising:
   - employment of a trace recorder configured to record a sequence of driver requests sent to the physical device and a sequence of physical device interface states before each driver request is issued,
   - application of a conformance checker configured to execute the virtual device with the sequence of driver requests from the trace recorder,
   - comparison of results from a trace of the physical device and the virtual device, and
   - delivery of an output report based on the comparison, the report including information indicative of identified inconsistencies between the virtual device and the physical device, or a lack thereof.

* * * * *